United States Patent
Lemmey et al.

(10) Patent No.: US 9,654,813 B2
(45) Date of Patent: *May 16, 2017

(54) METHOD AND SYSTEM FOR SYNCHRONIZED MULTI-VENUE EXPERIENCE AND PRODUCTION

(71) Applicant: Wickr Inc., San Francisco, CA (US)

(72) Inventors: Tara Lemmey, San Francisco, CA (US); Stanislav Vonog, San Francisco, CA (US); Nikolay Surin, San Francisco, CA (US)

(73) Assignee: WICKR INC., San Francisco, CA (US)

(*) Notice: Subject to any disclaimer, the term of this patent is extended or adjusted under 35 U.S.C. 154(b) by 79 days.

This patent is subject to a terminal disclaimer.

(21) Appl. No.: 13/815,786

(22) Filed: Mar. 15, 2013

(65) Prior Publication Data
US 2014/0068681 A1   Mar. 6, 2014

Related U.S. Application Data

(60) Provisional application No. 61/696,510, filed on Sep. 4, 2012.

(51) Int. Cl.
*H04N 21/242* (2011.01)
*H04L 12/18* (2006.01)

(52) U.S. Cl.
CPC ....... *H04N 21/242* (2013.01); *H04L 12/1822* (2013.01); *H04L 12/1827* (2013.01)

(58) Field of Classification Search
CPC ............ H04L 12/1822; H04L 12/1827; H04N 21/242

See application file for complete search history.

(56) References Cited

U.S. PATENT DOCUMENTS

| | | | |
|---|---|---|---|
| 5,610,653 A * | 3/1997 | Abecassis | 348/170 |
| 2002/0069265 A1 * | 6/2002 | Bountour et al. | 709/219 |
| 2003/0055745 A1 | 3/2003 | Kim | |
| 2006/0020990 A1 | 1/2006 | McEneaney | |
| 2008/0209476 A1 | 8/2008 | Shanks et al. | |
| 2009/0013086 A1 * | 1/2009 | Greenbaum | 709/231 |
| 2009/0044216 A1 * | 2/2009 | McNicoll | 725/5 |

OTHER PUBLICATIONS

International Search Report and Written Opinion of International Patent Application No. PCT/US2013/057532 with a mailing date of Dec. 11, 2013.

* cited by examiner

*Primary Examiner* — Rong Le
(74) *Attorney, Agent, or Firm* — Perkins Coie LLP

(57) ABSTRACT

The present disclosure discloses methods and systems for an interactive event experience capable of synchronizing two or more physical venues, with live events happening at one or more venues. In some embodiments, a system may synchronize the live event experience by equalizing remote participants with local ones, and remote shared screens with local ones. In some embodiments, attention management may be provided to local and remote participants. In some embodiments, a cloud-based broadcasting system may be provided at a local venue and/or remote venues.

34 Claims, 27 Drawing Sheets

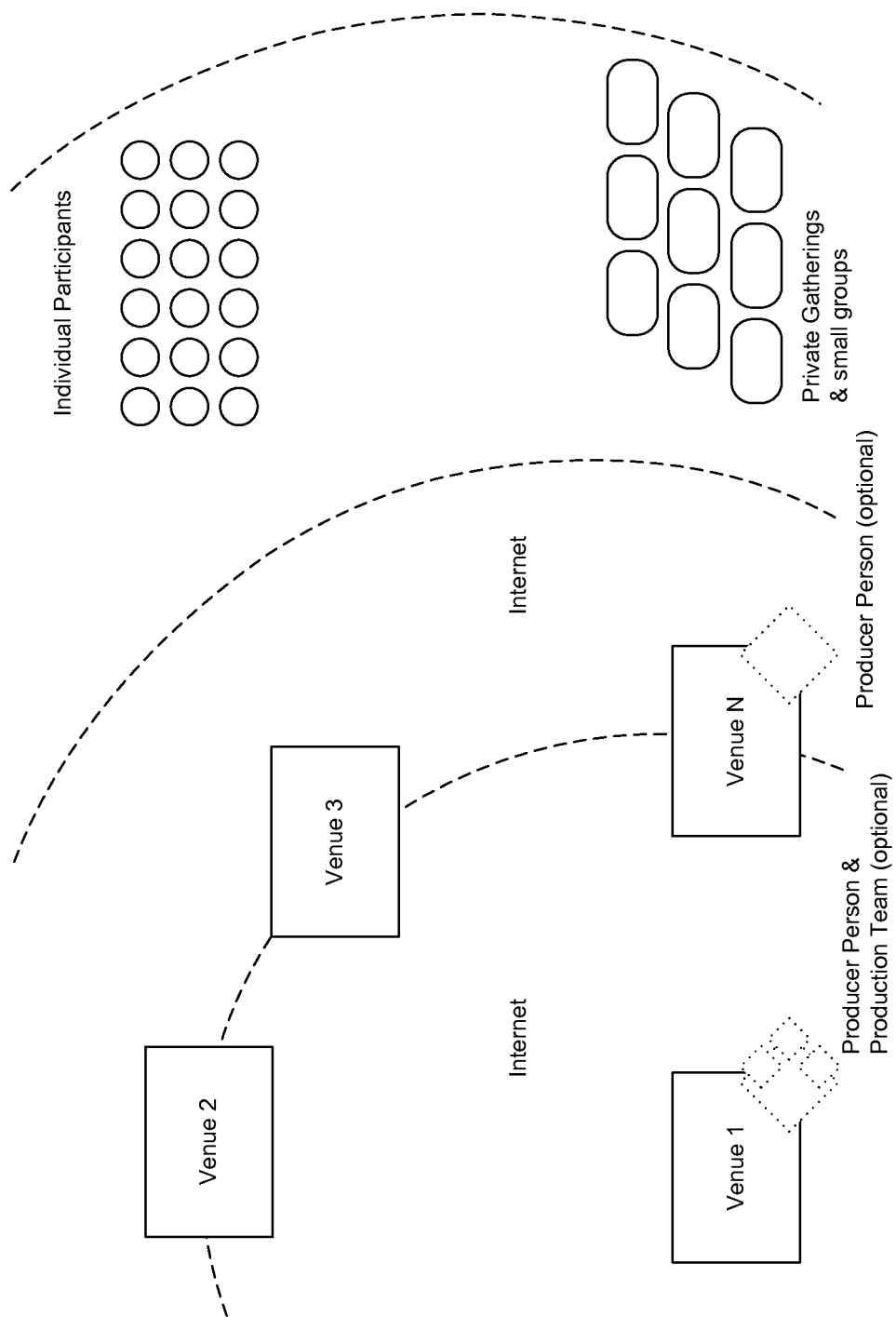

METHOD AND SYSTEM FOR SYNCHRONIZED MULTI-VENUE EXPERIENCE AND PRODUCTION

CROSS REFERENCE

This application claims the benefit of U.S. Provisional Patent Application Ser. No. 61/696,510 filed on Sep. 4, 2012, and the subject matter thereof is incorporated herein by reference in its entirety.

FIELD OF INVENTION

The present disclosure generally relates to methods and systems for an interactive event experience, and in particular to an interactive event experience capable of coupling and synchronizing an interactive event experience at two or more physical venues, with live events happening at one or more venues.

BACKGROUND

Interactive events allow audience to interact with each other and with speakers or performers. Each interactive experience can be unique and fun. However, interactive events have been constrained to one physical location.

While live events can be broadcasted through Internet or TV channels, interaction options are limited. Each participant of a live event can watch the same live video stream. Participants do not feel connected with other participants in remote physical venues nor the performer(s) or speaker(s) of the live event.

SUMMARY OF THE INVENTION

The present disclosure includes a variety of methods and systems for an interactive event experience capable of synchronizing participants at a plurality of physical venues, with live events happening at one or more venues. In some embodiments, the interactive event experience may be synchronized by equalizing remote participants with local ones, and remote shared screens with local ones.

Some embodiments may provide options for a host participant to create an interactive live event at a local host venue. Participants can join the interactive live event at the local host venue or remote physical venues. Attention management can be provided to local and remote participants to actively interact with participants at other venues. The live events happening at each of the plurality of physical venues and interactions between participants at different venue locations can be coupled and synchronized between all participants across the plurality of physical venues.

In some embodiments, live stream signals, including audio signals, from each of the plurality of physical venues are collected by an experience platform and broadcasted to each physical venue. The live stream signals are displayed in a plurality of objects on the display device of each physical venue. Each of the plurality of objects may correspond to live stream signals from a specific physical venue. In some embodiments, the live stream signals may have computing element that can enhance display appearance of the live stream signals on the display device.

When the experience platform broadcasts synchronized live stream signals to the plurality of physical venues, the experience platform may generate signals to manage presentation of the plurality of objects on a specific display device of each of the plurality of physical venues. For example, the experience platform may automatically adjust appearance and volume of each object on the display device of a specific venue based on contents of the interactive events simultaneously happening at the plurality of physical venues.

In some embodiments, presentation of the plurality of objects on a display device at a specific physical venue is managed by a producer at the specific physical venue. The producer may use a producer device to manage appearance and volume of each of the plurality of objects on the display device at the specific physical venue. In some embodiments, the producer may manage a part of presentation (e.g., color) of the plurality of objects on display devices of other physical venues of the interactive event.

In some embodiments, two or more smart devices with built-in cameras may be provided and pre-positioned with different sight angles at a host venue of an interactive event. For example, one smart device can be positioned to capture the host participant and another device positioned to capture participants at the host venue. One or more smart device with built-in camera may also be provided at a specific remote physical venue to capture participants at the specific venue. An experience platform can couple and synchronize video and audio signals from a plurality of physical venues of the interactive event and broadcast in substantially real-time the synchronized signals to display devices of all venues. In some embodiments, a cloud-based broadcasting system may be provided at a local venue and/or remote venues.

In some embodiments, an AV system can be provided at a specific physical venue of an interactive event. The AV system can couple and synchronize video and audio signals captured at the specific physical venue and transmit the synchronized signals to an experience platform of the interactive event.

While multiple embodiments are disclosed, still other embodiments of the present disclosure will become apparent to those skilled in the art from the following detailed description, which shows and describes illustrative embodiments of the invention. As will be realized, the invention is capable of modifications in various aspects, all without departing from the scope of the present disclosure. Accordingly, the drawings and detailed description are to be regarded as illustrative in nature and not restrictive.

BRIEF DESCRIPTION OF DRAWINGS

These and other objects, features, and characteristics of the present disclosure will become more apparent to those skilled in the art from a study of the following detailed description in conjunction with the appended claims and drawings, all of which form a part of this specification. In the drawings:

FIG. 1C illustrates another example of interactive event experience rendered by the interactive event experience system in FIG. 1 according to another embodiment(s) of the present disclosure.

Figure 1A:
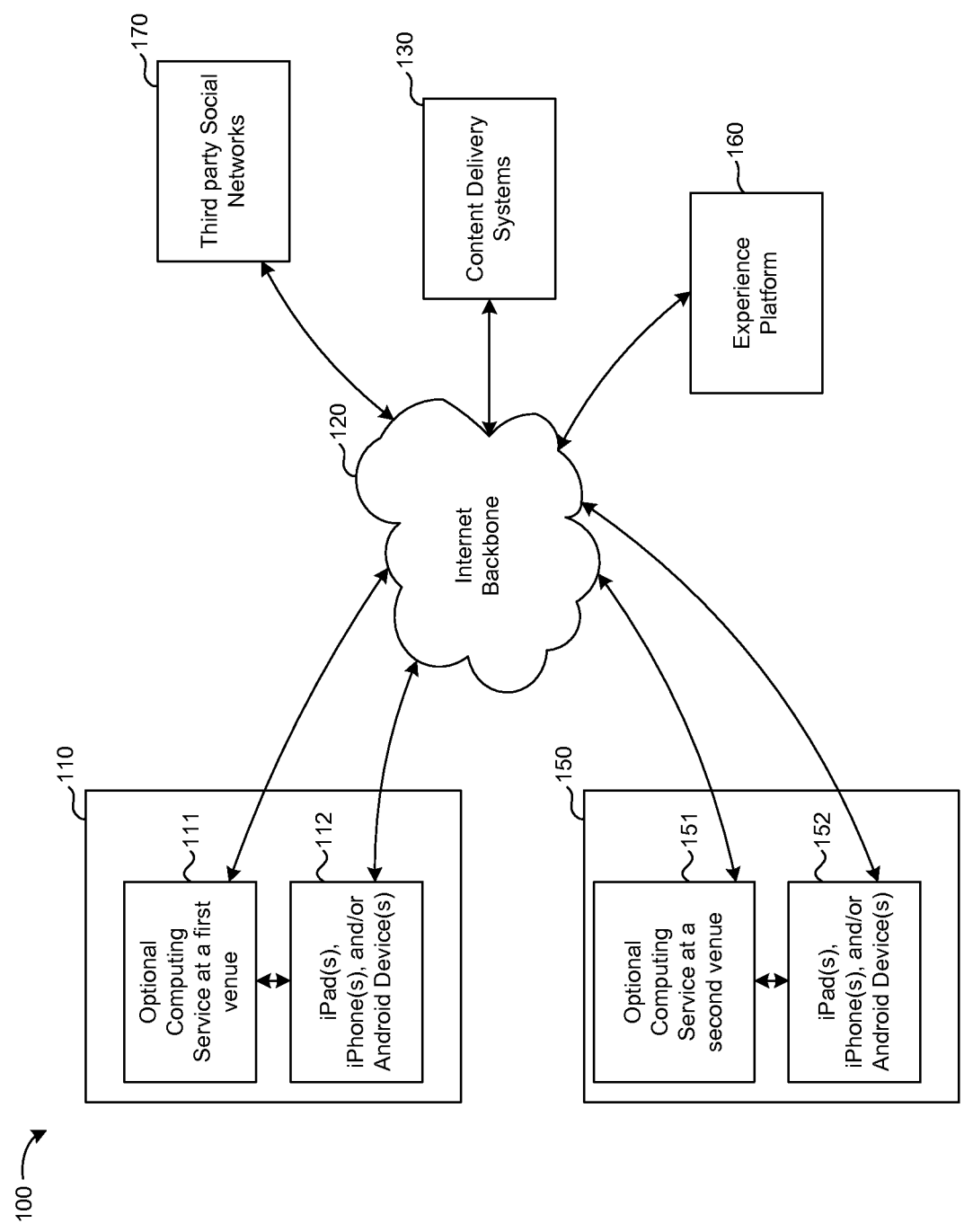
FIG. 1A illustrates an interactive event experience system according to one embodiment of the present disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present disclosure generally relates to methods and systems for providing an interactive event experience. More specifically, various embodiments of the present invention relate systems and methods for coupling and synchronizing an interactive event experience at two or more physical venues, with live events happening at one or more venues. Traditionally, participants of live events (e.g., live shows and lectures) can watch live events via TV channels or Internet. However, interaction options between participants at different physical venues are very limited. Participants at the remote physical venues don't feel connected to participants in other physical venues. It's largely a passive watching experience for all participants. In contrast, various embodiments of the present disclosure provide participants an experience platform that includes events simultaneously happening at a plurality of physical venues of a live event and contents shared by a host participant of the live event. Any specific participant can play an active role in the live event by interacting with the host participant or participants at other physical venues and be a part of an interactive event experience synchronizing across the plurality of physical venues.

While examples described herein refer to an interactive event experience system, the descriptions should not be taken as limiting the scope of the present discloser. Various alternative, modifications and equivalents will be apparent to those skilled in the art without varying from the spirit of the invention. For example, coupling and synchronizing an interactive event experience may be implemented in any computing system organizing live data stream. For another example, the interactive event experience system may include multiple computer systems spanning multiple locations, or reside in a cloud.

FIG. 1A illustrates an interactive event experience system 100 suitable for providing an interactive event experience. The system may include an experience platform 160, a first physical venue 110 and one or more other physical venues 150.

The host venue 110 may include two or more smart devices 112, such as iPad®, iPhone®, Android® device, tablet device, etc., an optional computing service 111, and an internet connection coupling the two or more smart devices to a cloud computing service including the experience platform 160. Each of the smart devices has at least one built-in camera. Each of the one or more remote venues 150 may include at least one smart device 152, an optional computing service at the specific venue 151, and an internet connection coupling at least one smart device to the cloud computing service 130. The experience platform 160 can couple video and audio signals from the first venue 110 and the one or more other physical venues 150, and provide a synchronized interactive event experience to all participants.

In some embodiments, the smart devices 112 and 152 at the physical venues 110 and 150 can be any suitable devices to transmit a variety of data types, including video, audio, human gestures, heterogeneous device input, interactive participation, human emotional cues and human voice. For example, the smart devices 110 and 152 can be, but not limited to, handheld computers, laptops, personal computers, mobile phones, TV's, projectors, stand-alone hardware decoders and mobile electronic devices. The smart devices 110 and 152 can have one or more of a sensor, camera, microphone, touch input, optional GPU, wired or wireless network interface, audio output, display device etc.

The smart devices 112 and 152 at the physical venues 110 and 150 are also coupled to a content distribution network (CDN) 130 and third party networking systems 170 via the Internet Backbone 120. The CDN 130 is a large distributed system of servers deployed in the Internet Backbone 120 and serves clients with Internet content, such as web objects (e.g., texts, graphics, URLs and scripts), downloadable objects (e.g., media files, software and documents), applications (e.g., e-commerce and portals), live streaming media, on-demand streaming media and contents on social networks etc. The smart devices 112 and 152 can fetch content directly from the CDN 130 and the third party networking systems 170.

Options can be provided to a host participant to create an interactive event spanning across a plurality of physical venues. The host participant may define the interactive event as a public event or a private event. The host participant may invite online participants and/or participants at remote physical venues to join the interactive event. If the interactive event is private, only the host participant and/or invited participants can invite additional participants to join the interactive event.

In some embodiments, the interactive event may include at least a content layer with video and audio dimensions. The content layer may include events simultaneously happening at the plurality of physical venues and/or videos that the host participant shares with other participants. Based on characteristics of a specific physical venue, the content layer of the interactive event can be displayed differently on a shared screen at the specific physical venue.

Some embodiments may provide a plurality of objects on the screen of a specific physical venue, with each object corresponding to live events happening at the corresponding physical venue. In some implementations, the volume of participants from other physical venues may be a function of proximity between the object corresponding to the specific physical venue and the objects corresponding to the other physical venues. In some implementations, the volume of participants from other physical venues may be set as a constant ambient level or muted if the distances of their corresponding objects are beyond a certain distance of the object corresponding to the specific physical venue.

The host participant can be provided options to select and engage in dialogue with a specific participant at any particular remote physical venue. During the dialogue, the objects corresponding to video and audio signals from the host participant and the particular remote physical venue may become larger, as in the size of a particular object, and/or more prominent audio in the interactive event. In some embodiments, close-up video of the host participant and/or the specific participant may be provided while the host participant and/or the specific participant are talking.

In some embodiments, when the host participant and/or the specific participant start to talk, the volume of audio signals from other dimensions may go down. When the host participant and/or the specific participant stop talking, the volume of audio signals from other dimensions may go up again. In some implementations, video(s) that is shared among all participants in the content layer may be replaced with video and audio signals from the host participant and/or the specific participant who are talking. Some embodiments may provide option for the host participant to designate one or more participants as co-host participants. The one or more co-host participants may be provided the same privilege and options as those for the host participant.

Participants and display screens at the host venue and remote venues are equalized through an experience platform. The experience platform can couple and synchronize video and audio signals from the host and remote venues, resulting in a synchronized and interactive event experience between all participants. For example, at least two smart devices having built-in camera can be pre-positioned with different sight angles at a host venue of an interactive event. At least one remote smart device having built-in camera can be pre-positioned at each of one or more remote physical venues of the interactive event. Local video signals at the host venue may be transmitted from the at least two smart devices to an experience platform via internet. Local audio signals at the host venue may be transmitted from one of at least two smart devices to the experience platform via internet. Remote video and audio signals may also be transmitted from at least one smart device at each of the one or more remote physical venues to the experience platform. The experience platform can couple and synchronize local and remote video and audio signals. Video signals from the host venue and remote venues can be displayed as a plurality of objects on a content layer provided by the experience platform, each of the plurality of objects corresponding to video signals from a specific venue.

In some embodiments, the experience platform may take one set of audio signals from a specific physical venue at any particular time. The set of audio signals from the specific physical venue can be generated by a microphone, one of the smart device(s), or combined audio signals from the microphone and the smart device. The combined audio signals can be provided by an AV system coupled to the microphone and the smart device at the specific physical venue via a Wi-Fi or a wired connection.

In some embodiments, options are provided to a particular participant at host and or remote physical venues to manage attention in the interactive event. The particular participant may draw and/or write on the content layer with a variety of color selections. The color ink of drawing or writing can be color-coded with each color representing a specific meaning. For example, certain colors, such as red, may be designated to participants who would like attention from the host participant or are ready to answer or ask questions. Certain colors, such as green, may be designated to a specific participant who is speaking. After the specific participant finishes speaking, his or her designated color can be changed back to previously designated colors, such as white, black, etc.

In some embodiments, participants from same or different physical venues can be organized into groups. Each group is assigned with a specific color and can play a specific role corresponding to the specific color. For example, participants assigned with red may play the role of providing instinctive gut reactions or statement of emotional feeling happening at the live event. Participants assigned with green may play the role of applying logic to identify benefits in connection with topics of the live event. Participants assigned with black may play the role of using logic to identify flaws or barriers in connection with topics of the live event.

In some implementations, the specific participant may initiate an interaction with other participants or the host participant by throwing animated objects, such as flowers, an egg, a tomato, etc., at the screens of those participants. In some implementations, a specific participant at a remote venue can participate in the interactive event through gestures and/or actions, e.g., clapping, cheering, jeering, and booing.

Some embodiments may provide methods instantiated on an experience platform, a local computer and/or a portable device. In some implementations, methods may be distributed across local and remote devices in the cloud computing service.

Figure 1B:
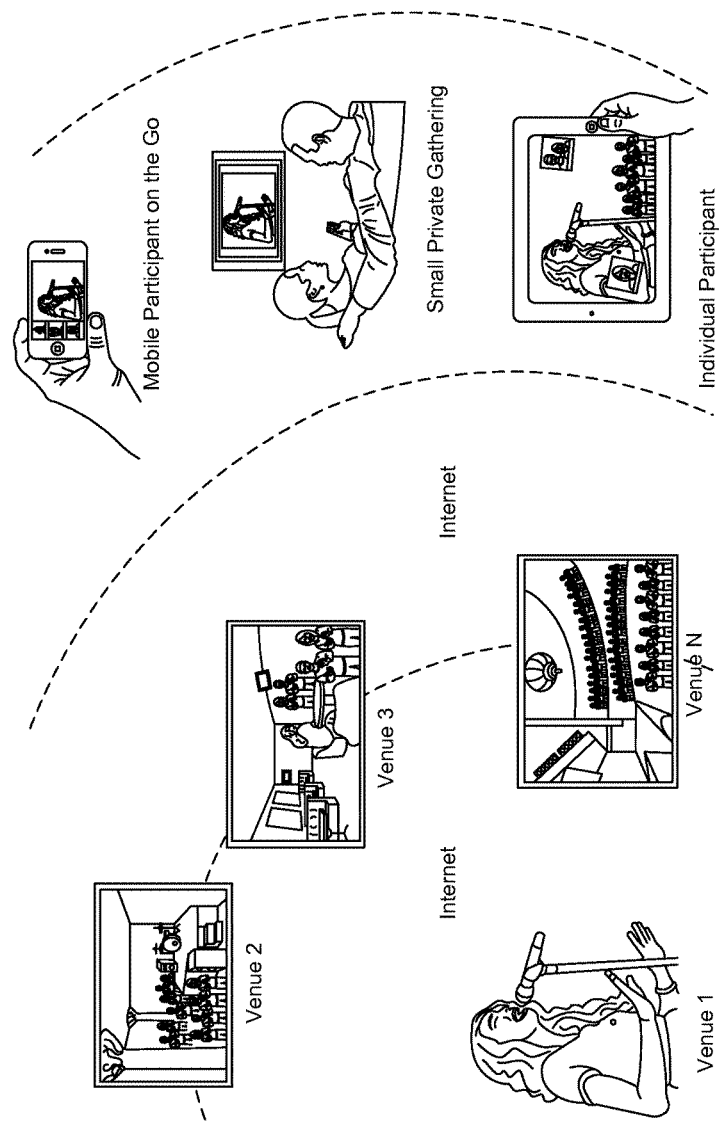
FIG. 1B illustrates an example of interactive event experience rendered by the interactive event experience system in FIG. 1 according to another embodiment(s) of the present disclosure.

FIGS. 1B&C illustrate examples of interactive event experience rendered by the interactive event experience system in FIG. 1A according to another embodiment(s) of the present disclosure. Live stream signals of events happening at a plurality of physical venues of an interactive event can be coupled and synchronized among participants across a plurality of physical venues. The physical venues may include, but not limited to, sports bar, theatre, stadium, class room, home, etc. An event happening at Venue 1 can be broadcasted to other venues (e.g., Venues 2, 3, . . . N) and/or participants on the go (e.g., mobile participants on the go, participants in small private/group gatherings and individual participants). In some embodiments, a specific venue may include an optional production person or team to render presentation of live stream signals of events happening at the plurality of physical venues to participants at the specific venue.

Figure 2A:
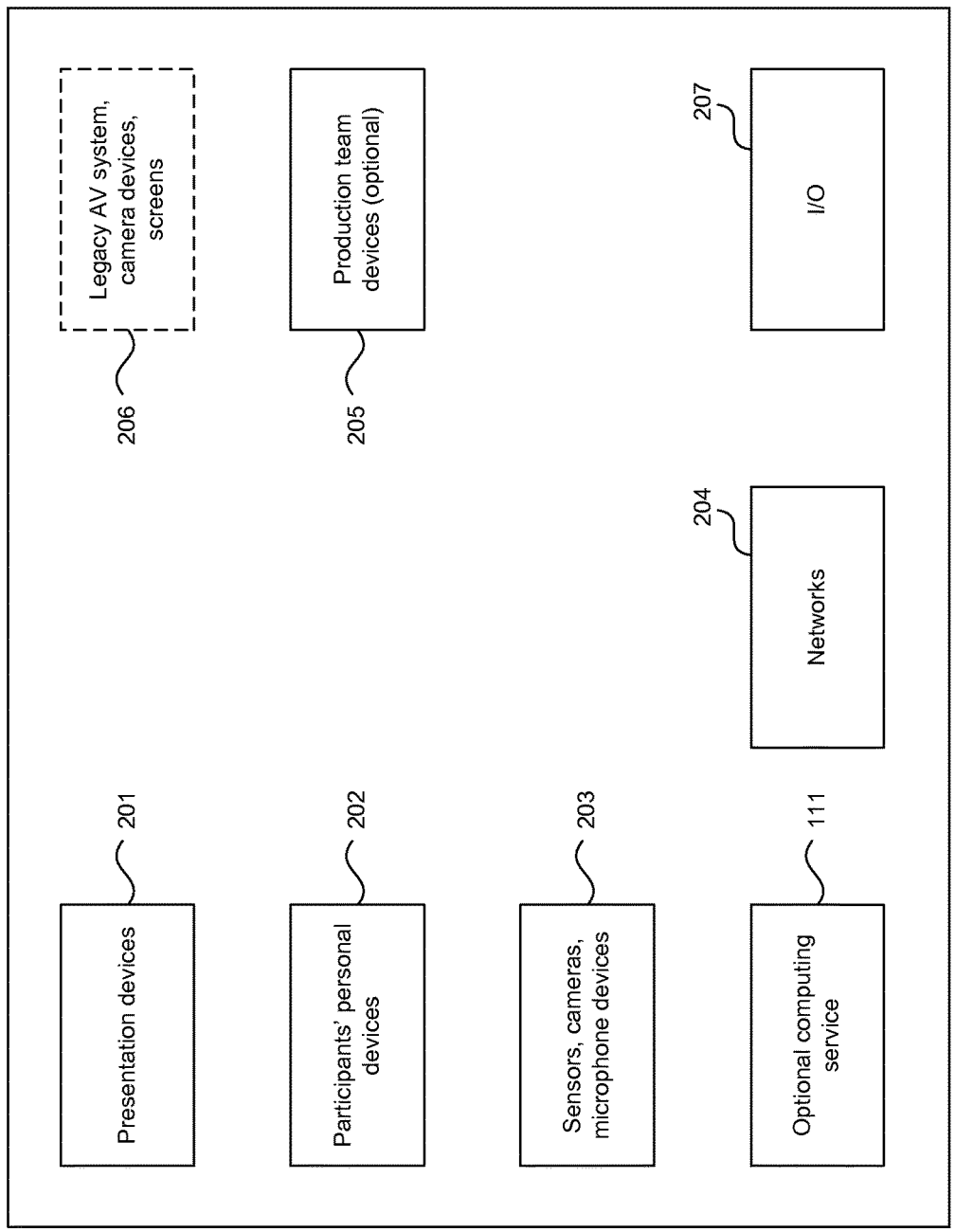
FIG. 2A illustrates a schematic block diagram of devices at a physical venue according to another embodiment(s) of the present disclosure.

FIG. 2A illustrates a schematic block diagram of devices at a physical venue according to another embodiment(s) of the present disclosure. The physical venue 110 may include presentation devices 201, participants; personal devices 202, networks 204, optional production team devices 205 and devices 203 (e.g., sensors, cameras, microphone devices) that can capture live events happening at the physical venue 110. The networks 204 can include one or more suitable network, which may include, but not limited to, Wi-Fi network, cellular network, and satellite up/down links. In some embodiments, the physical venue 110 may also include or couple to presentation devices, for example, legacy AV system, camera devices and screens etc.

Figure 2B:
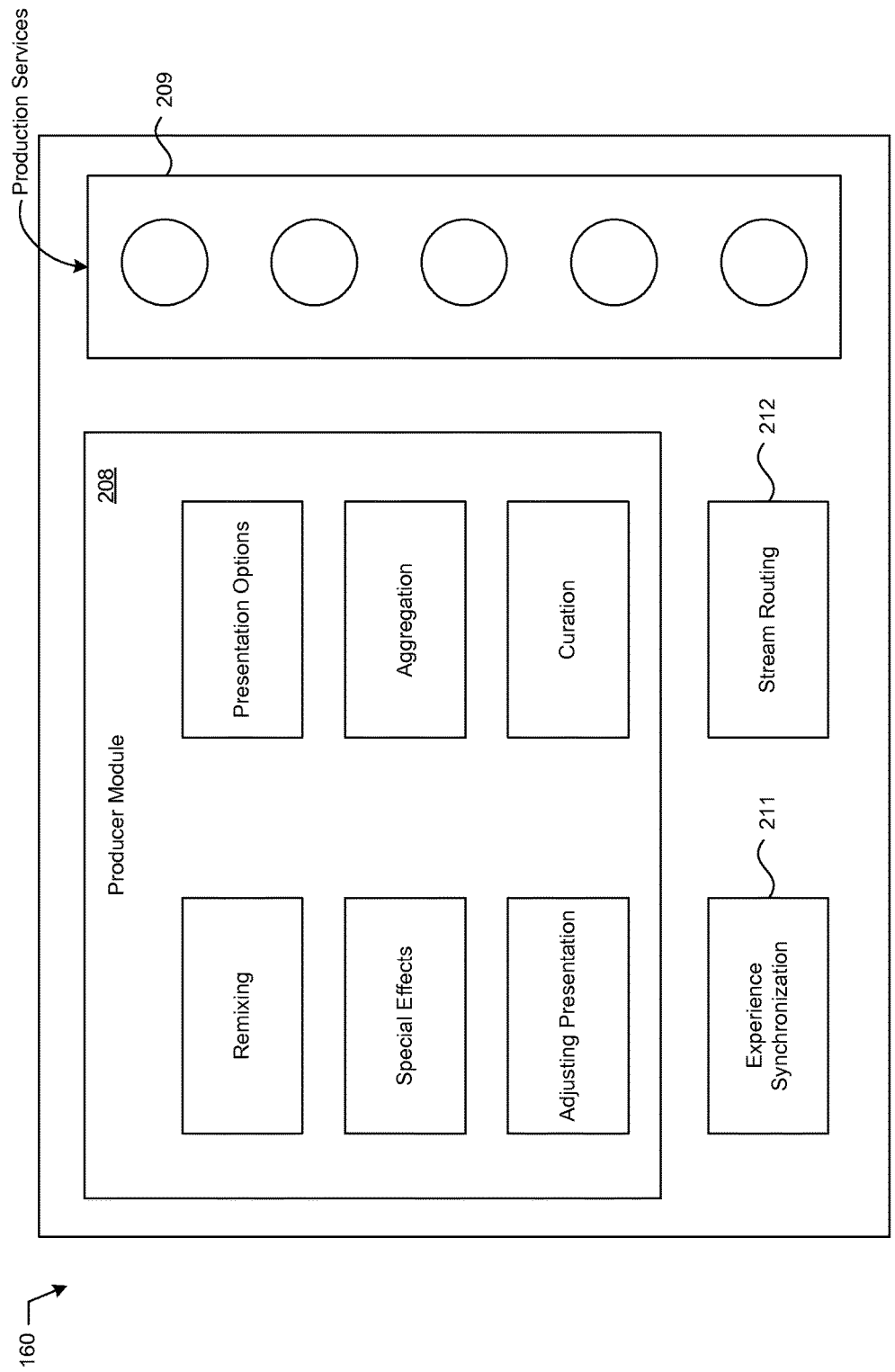
FIG. 2B illustrates a schematic block diagram of an experience platform according to yet another embodiment(s) of the present disclosure.

FIG. 2B illustrates a schematic block diagram of an experience platform according to yet another embodiment(s) of the present disclosure. The experience platform may include a producer module 208, production services 209, experience synchronization module 211 and stream routing module 212. The experience synchronization module 211 can couple and synchronize live stream signals of events happening at a plurality of physical venues of an interactive event and the stream routing module 212 can route synchronized live stream signals to each of the plurality of physical venues and/or other participants of the interactive events. In some embodiments, the producer module 208 may include a plurality of functions to render the synchronized live stream signals to each of the plurality of physical venues. The plurality of functions may include, but not limited to, remixing, presentation options, special effects, adjusting presentation (e.g., volume and lights), curation (e.g., ability to select) and aggregation (e.g., voting, panning, or zooming).

Figure 2C:
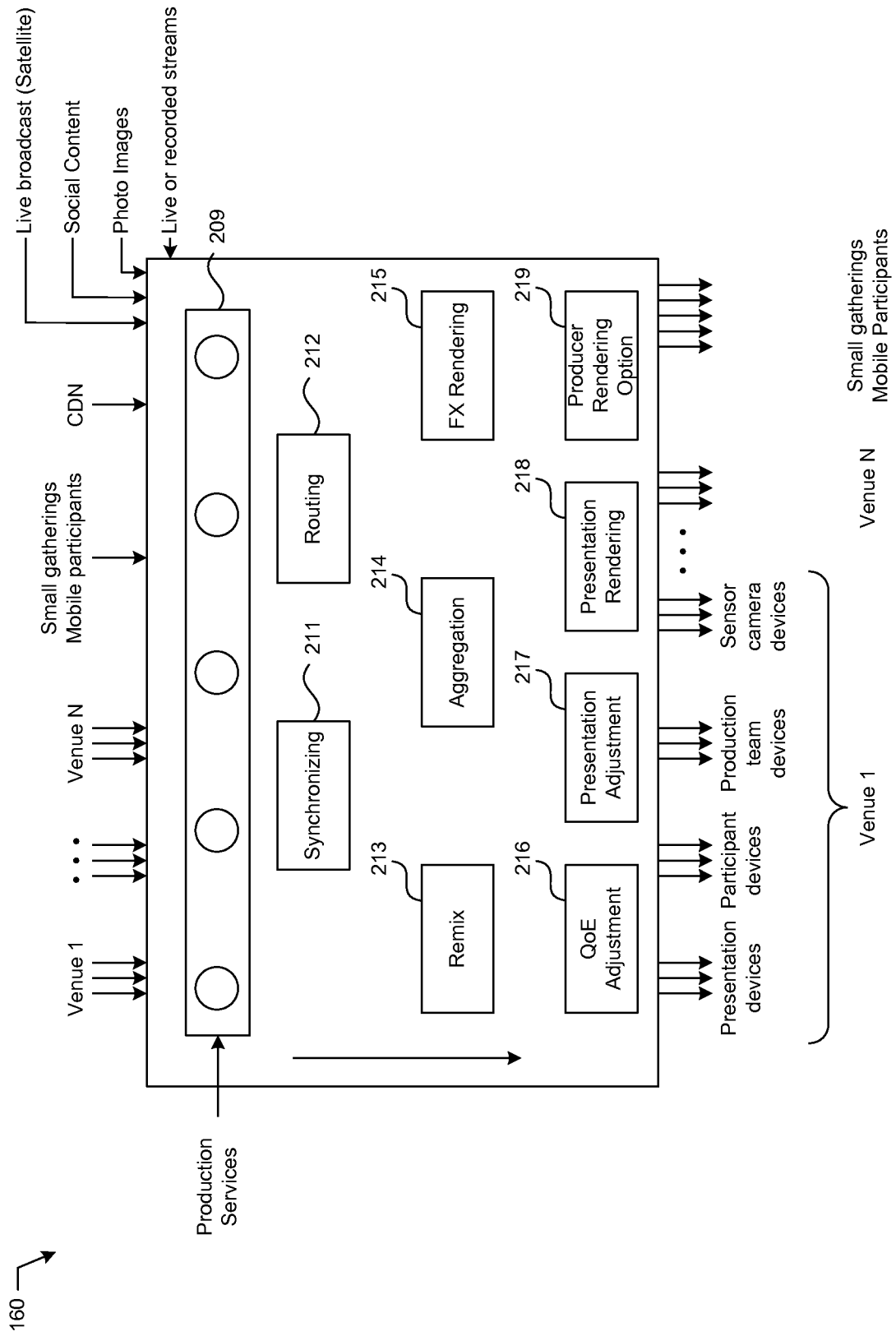
FIG. 2C illustrates an example of an experience platform that can couple, synchronize and render live stream signals from a plurality of physical venues according to yet another embodiment(s) of the present disclosure.

FIG. 2C illustrates an example of an experience platform 160 that can couple, synchronize and render live stream signals from a plurality of physical venues according to yet another embodiment(s) of the present disclosure. The experience platform 160 can receive and process a plurality of contents associated with an interactive event. The plurality of contents may include, live stream signals from a plurality of physical venues of the interactive event, live stream signals from small gatherings and mobile participants, content from CDN, live broadcast, social content, photo images and live or recorded streams. The live stream signals from the plurality of physical venues and small gatherings and mobile participants may include, but not limited, one or more of live video streams, audio streams, or control streams. The experience platform 160 may include a plurality of function modules to couple and synchronize the plurality of contents. The plurality of function modules may include, but not limited to, synchronizing module 211, routing module 212, remix module 213, aggregation module 214, FX rendering module 215, QoE adjustment module 216, presentation adjustment module 217, presentation rendering module 218, and producer rendering option 219. In some embodiments, the coupled and synchronized contents can be broadcasted to participants at the plurality of physical venues and/or small gatherings and mobile participants in substantially real-time.

Figure 2D:
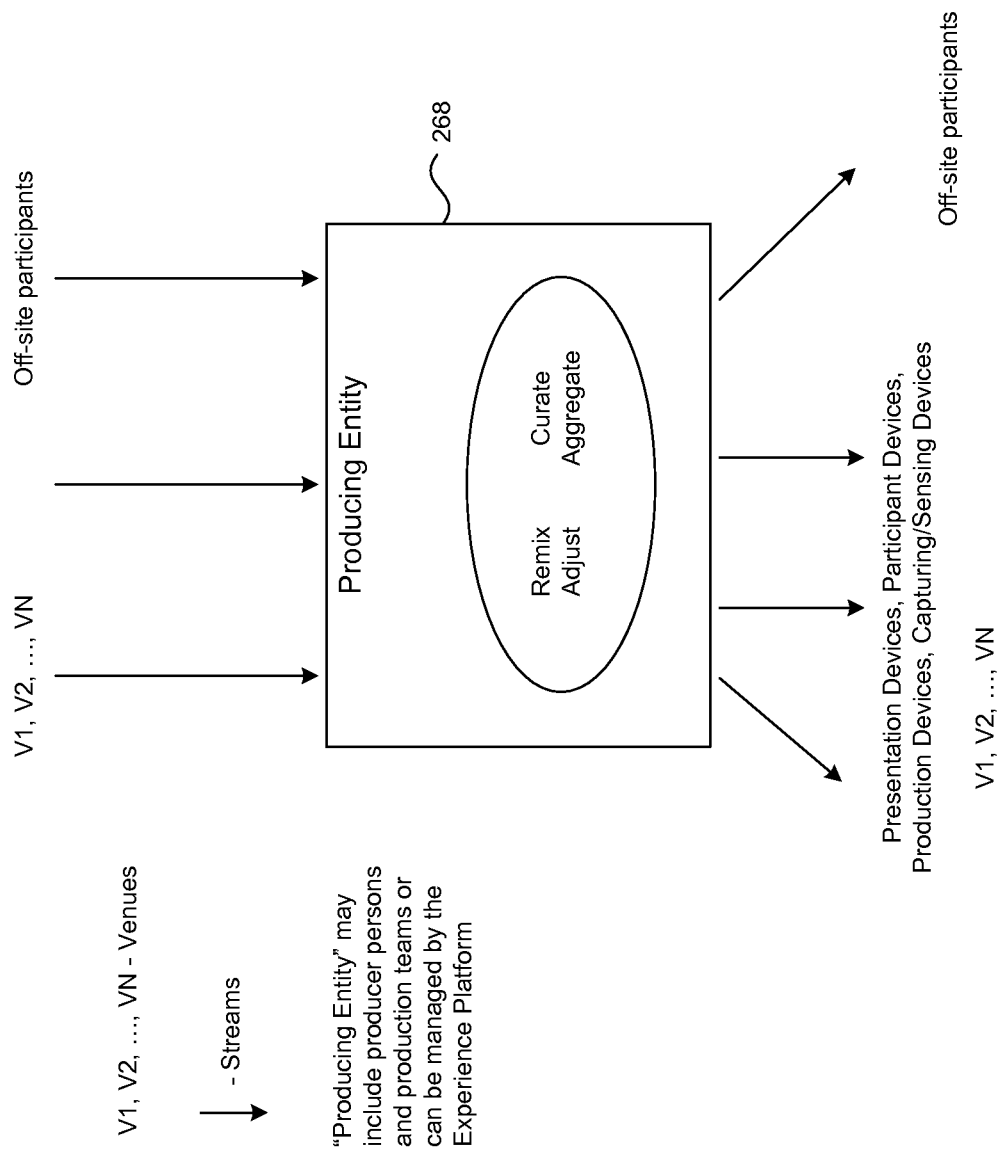
FIG. 2D illustrates a schematic block diagram of a producing entity that can manage the presentation of an interactive event for venues and/or off-site participants according to yet another embodiment(s) of the present disclosure.

FIG. 2D illustrates a schematic block diagram of a producing entity that can manage the presentation of an interactive event for venues and/or off-site participants according to yet another embodiment(s) of the present disclosure. The producing entity 268 can couple and synchronize the live stream signals from the plurality of physical venues and off-site participants of the interactive event. The synchronized live stream signals are then presented to participants at the plurality of physical venues and the off-site participants. The producing entity 268 may be managed by the experience platform 160. In some embodiments, the producing entity 268 may include a production person or team.

Figure 2E:
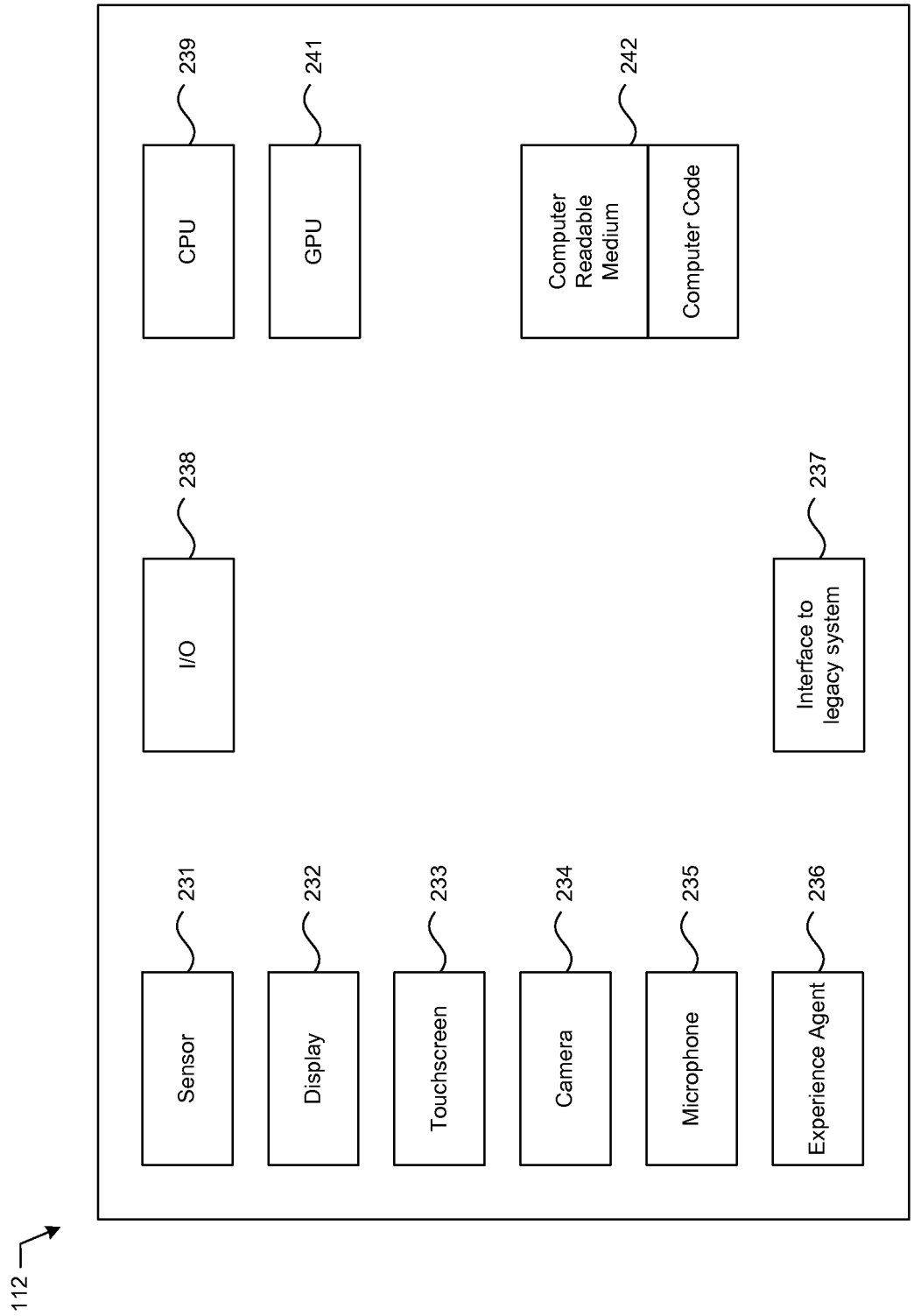
FIG. 2E illustrates a schematic block diagram of a participant's device according to yet another embodiment(s) of the present disclosure.

FIG. 2E illustrates a schematic block diagram of a participant's device 112 according to yet another embodiment(s) of the present disclosure. The device 112 may include CPU 239, GPU 241, sensor 231, display 232, touch screen 233, camera 234, microphone 235, experience agent 236, I/O 238, interface 237 that can be coupled with optional legacy system, and computer readable medium 242 that can store computer code. Various components in FIG. 2E are included for illustrative purposes. A participant's device may include different, part or additional components than those shown in FIG. 2E.

Figure 2F:
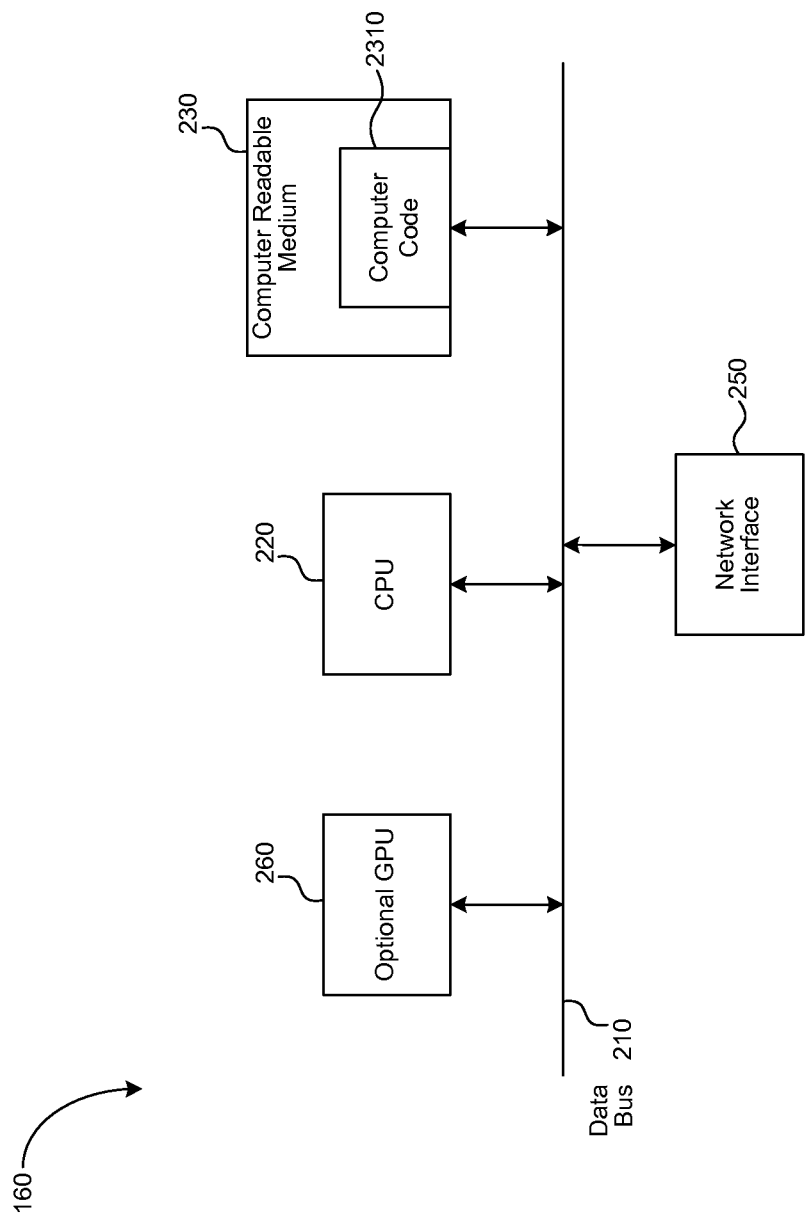
FIG. 2F illustrates a schematic block diagram of a cloud-based server of an experience platform according to yet another embodiment(s) of the present disclosure.

FIG. 2F illustrates a schematic block diagram of a cloud-based server of an experience platform 160 according to yet another embodiment(s) of the present disclosure. The server may include at least one processor 220, one or more optional GPU 260, one or more network interface 250 and one or more computer readable medium 230, all interconnected via one or more data bus 210. In FIG. 2F, various components are omitted for illustrative simplicity. FIG. 2F is intended to illustrate a device on which any suitable components described in this specification (e.g., any suitable components depicted in FIGS. 1-20) can be implemented.

The cloud-based server of an experience platform 160 may take a variety of physical forms. By way of examples, the server may be a desktop computer, a laptop computer, a personal digital assistant (PDA), a portable computer, a tablet PC, a wearable computer, an interactive kiosk, a mobile phone, a server, a mainframe computer, a mesh-connected computer, a single-board computer (SBC) (e.g., a BeagleBoard, a PC-on-a-stick, a Cubieboard, a CuBox, a Gooseberry, a Hawkboard, a Mbed, a OmapZoom, a Origenboard, a Pandaboard, a Pandora, a Rascal, a Raspberry Pi, a SheevaPlug, a Trim-Slice), an embedded computer system, or a combination of two or more of these. Where appropriate, the experience platform 160 may include one or more servers, be unitary or distributed, span multiple locations, span multiple machines, or reside in a cloud, which may include one or more cloud components in one or more networks. Where appropriate, cloud-based servers of an experience platform 160 may perform without substantial spatial or temporal limitation one or more steps of one or more methods described or illustrated herein. As an example and not by way of limitation, cloud-based servers of an experience platform 160 may perform in real time or in batch mode one or more steps of one or more methods described or illustrated herein. Cloud-based servers of an experience platform 160 may perform at different times or at different locations one or more steps of one or more methods described or illustrated herein, where appropriate.

A cloud-based server of the experience platform 160 preferably may include an operating system such as, but not limited to, Windows®, Linux® or UNIX®. The operating system may include a file management system, which organizes and keeps track of files. In some embodiments, a separate file management system may be provided. The separate file management can interact smoothly with the operating system and provide enhanced and/or more features, such as improved backup procedures and/or stricter file protection.

The at least one processor 220 may be any suitable processor. The type of the at least one processor 220 may comprise one or more from a group comprising a central processing unit (CPU), a microprocessor, a graphics processing unit (GPU), a physics processing unit (PPU), a digital signal processor, a network processor, a front end processor, a data processor, a word processor and an audio processor.

The one or more data bus 210 is configured to couple components of the cloud-based server to each other. As an example and not by way of limitation, the one or more data bus 210 may include a graphics bus (e.g., an Accelerated Graphics Port (AGP)), an Enhanced Industry Standard Architecture (EISA) bus, a front-side bus (FSB), a Hyper-Transport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Although the present disclosure describes and illustrates a particular bus, this disclosure contemplates any suitable bus or interconnects.

The one or more network interface 250 may include one or more of a modem or network interface. It will be appreciated that a modem or network interface can be considered to be part of a cloud-based server of the experience platform 160. The interface can include an analog modem, an asymmetric digital subscriber line (ADSL) modem, a cable modem, a doubleway satellite modem, a power line modem, a token ring interface, a Cambridge ring interface, a satellite transmission interface or any suitable interface for coupling a computer system to other computer systems. The interface can include one or more input and/or output devices. The I/O devices can include, by way of example but not limitation, a keyboard, a mouse or other pointing device, disk drives, printers, a scanner, a touch screen, a Tablet screen, and other input and/or output devices, including a display device. The display device can include, by way of example but not limitation, a cathode ray tube (CRT) display, a liquid crystal display (LCD), a 3-D display, or some other applicable known or convenient display device. For simplicity, it is assumed that controllers of any devices not depicted in the example of FIG. 2F reside in the interface.

The computer readable medium 230 may include any medium device that is accessible by the processor 220. As an example and not by way of limitation, the computer readable medium 230 may include volatile memory (e.g., a random access memory (RAM), a dynamic RAM (DRAM), and/or a static RAM (SRAM)) and non-volatile memory (i.e., a flash memory, a read-only memory (ROM), a programmable ROM (PROM), an erasable programmable ROM (EPROM), and/or an electrically erasable programmable ROM (EEPROM)). When appropriate, the volatile memory and/or non-volatile memory may be single-ported or multiple-ported memory. This disclosure contemplates any suitable memory. In some embodiments, the computer readable medium 230 may include a semiconductor-based or other integrated circuit (IC) (e.g., a field-programmable gate array (FPGA) or an application-specific IC (ASIC)), a hard disk, an HDD, a hybrid hard drive (HHD), an optical disc (i.e., a CD-ROM, or a digital versatile disk (DVD)), an optical disc drive (ODD), a magneto-optical disc, a magneto-optical drive, a floppy disk, a floppy disk drive (FDD), a magnetic tape, a holographic storage medium, a solid-state drive (SSD), a secure digital (SD) card, a SD drive, or another suitable computer-readable storage medium or a combination of two or more of these, where appropriate. The computer readable medium 230 may be volatile, non-volatile, or a combination of volatile and non-volatile, where appropriate.

Computer code 2310 may be stored on the one or more computer readable medium 230. As an example, but not by way of limitation, a cloud-based server of the experience platform 160 may load the computer code 2310 to an appropriate location on the one or more compute readable medium 230 for execution. The computer code 2310, when executed, may cause the cloud-based server to perform one or more operations or one or more methods described or illustrated herein. In some implementations, the operations may include, but are not limited to, receiving live stream signals, including audio signals, from each of a plurality of physical venues of an interactive event, synchronizing the live stream signals from the plurality of physical venues, displaying a plurality of objects on a content layer that is instantiated on the display device of each of the plurality of physical venues, each of the plurality of objects corresponding to live stream signals from a specific physical venue, and managing presentation of each of the plurality of objects on a particular display device at a particular physical venue.

As will be appreciated by one of ordinary skill in the art, the operations may be instantiated locally (i.e. on a local computer or a portable device) and may be distributed across a system including a portable device and one or more other computing devices. For example, it may be determined that the available computing power of the portable device is insufficient or that additional computer power is needed, and may offload certain aspects of the operations to the cloud.

Figure 3:
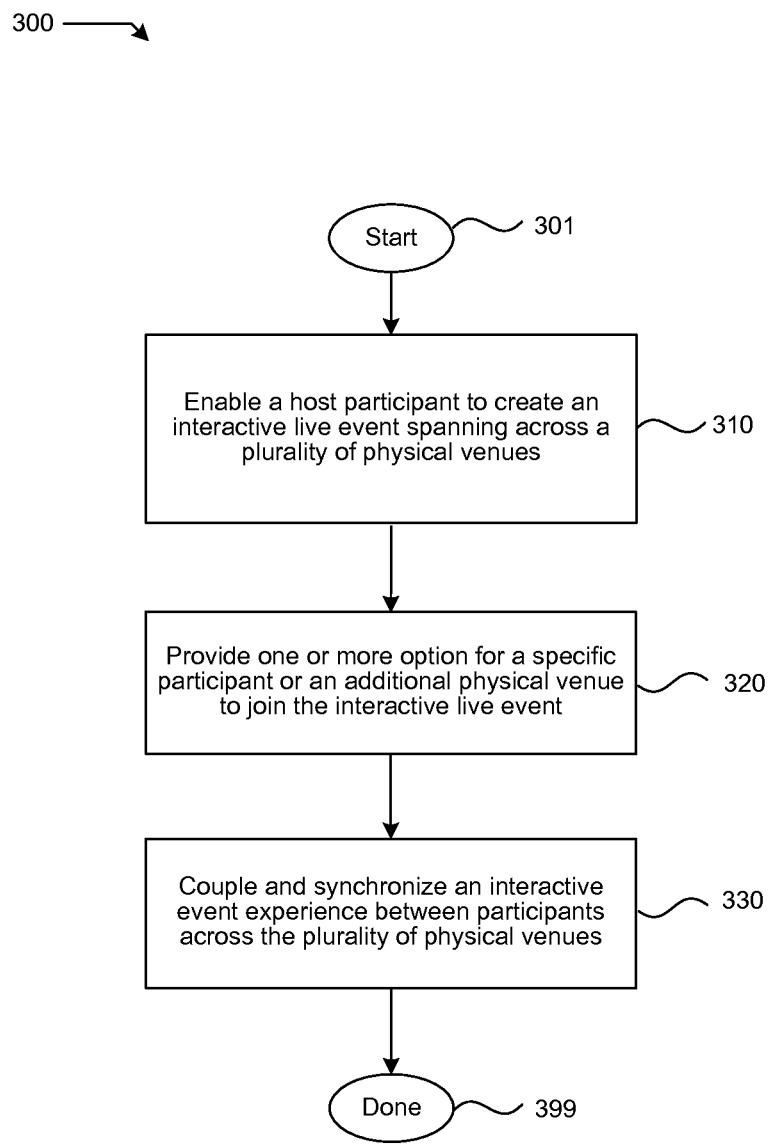
FIG. 3 illustrates a flow chart showing a set of operations 300 that may be used in accordance with yet another embodiment of the present disclosure.

FIG. 3 illustrates a flow chart showing a set of operations 300 that may be used in accordance with yet another embodiment of the present disclosure. At step 310, a host participant is provided option to create an interactive live event spanning across a plurality of physical venues. The interactive event experience may have various dimensions, such as a content layer with live video and audio dimensions and a video chat layer with interactive, graphics, ensemble dimensions, etc. The content layer may include video and audio of live events happening at a plurality of physical venues of the live event and/or shared videos by participants of the live event.

At step 320, one or more option may be provided for a remote participant to join the interactive event. A participant may opt to join an ongoing interactive event if the interactive event is a public event. If the interactive event is a private event, only the host participant and/or existing participants of the interactive event may invite new participants. At step 330, an interactive event experience may be coupled and synchronized among participants across the plurality of physical venues.

Figure 4:
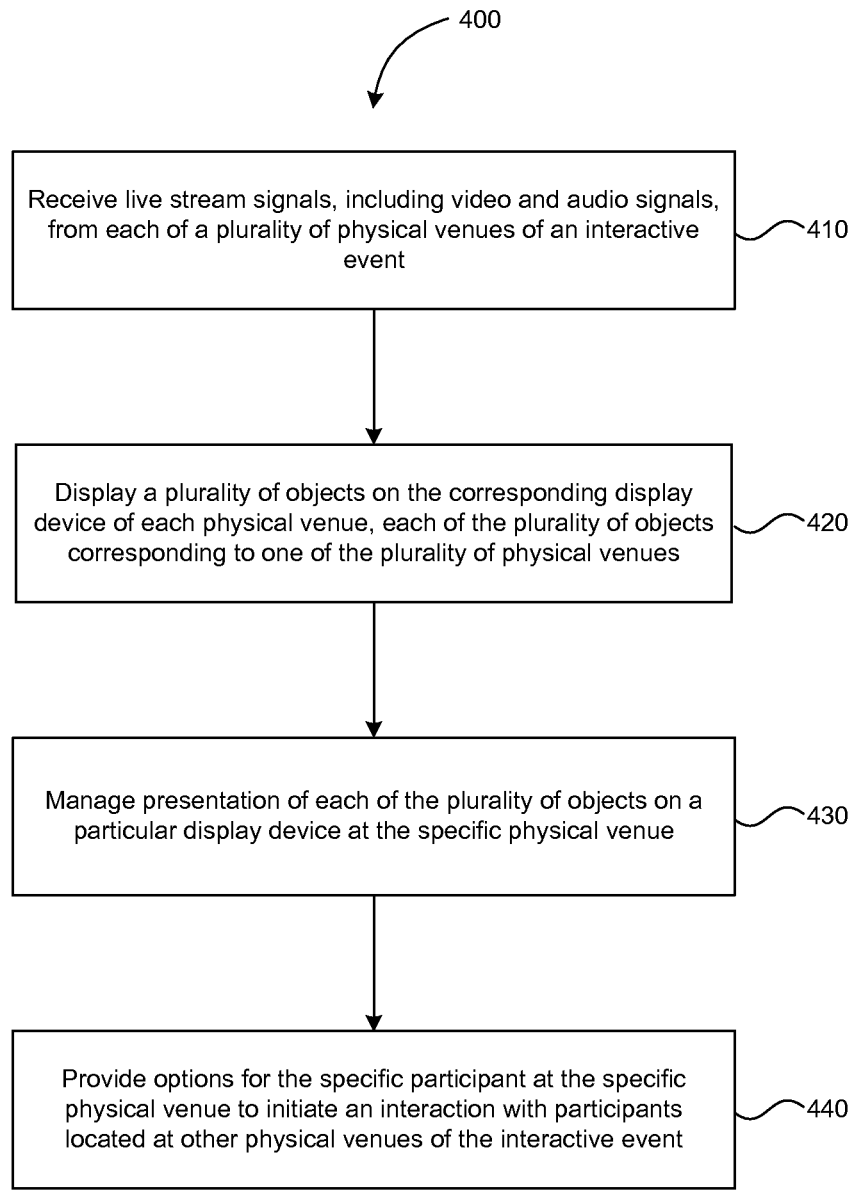
FIG. 4 illustrates a flow chart showing a set of operations 400 that may be used in accordance with yet another embodiment of the present disclosure.

FIG. 4 illustrates a flow chart showing a set of operations 400 that may be used in accordance with yet another embodiment of the present disclosure. At step 410, live stream signals, including video and audio signals, may be received from each of a plurality of physical venues of an interactive event. The live stream signals may include, but not limited to, close-up video of an individual participant (e.g., a host participant, a specific participant who is talking) and a group of participants (i.e., participants at a remote physical venue), pre-recorded video, graphic, and any suitable Internet content that may be shared between participants of the interactive event, such as texts, URLs, scripts, media files, software and documents etc.

At step 420, a plurality of objects may be displayed on the corresponding display screen of each physical venue. Each of the plurality of objects may correspond to one specific physical venue of the interactive event. In some implementations, a wide master shot capturing the overall live event at the host venue may be provided as a content layer or a base layer on the display screen of each venue.

Option may be provided to a specific participant at a specific physical venue to manage the position of its corresponding object relative to other objects, at step 430. The volume of participants from another particular physical venue may be a function of distance between the object corresponding to the specific physical venue and the objects corresponding to the particular physical venue. The specific participant may move around different position to experience different dimensions of the interactive event experience.

At step 440, option may be provided to the specific participant at the specific physical venue to initiate an interaction with participants located at other physical venues of the interactive event. In some implementations, the specific participant may draw and/or write on the content layer with certain colors, which are designated to participants who are ready to talk.

Figure 5:
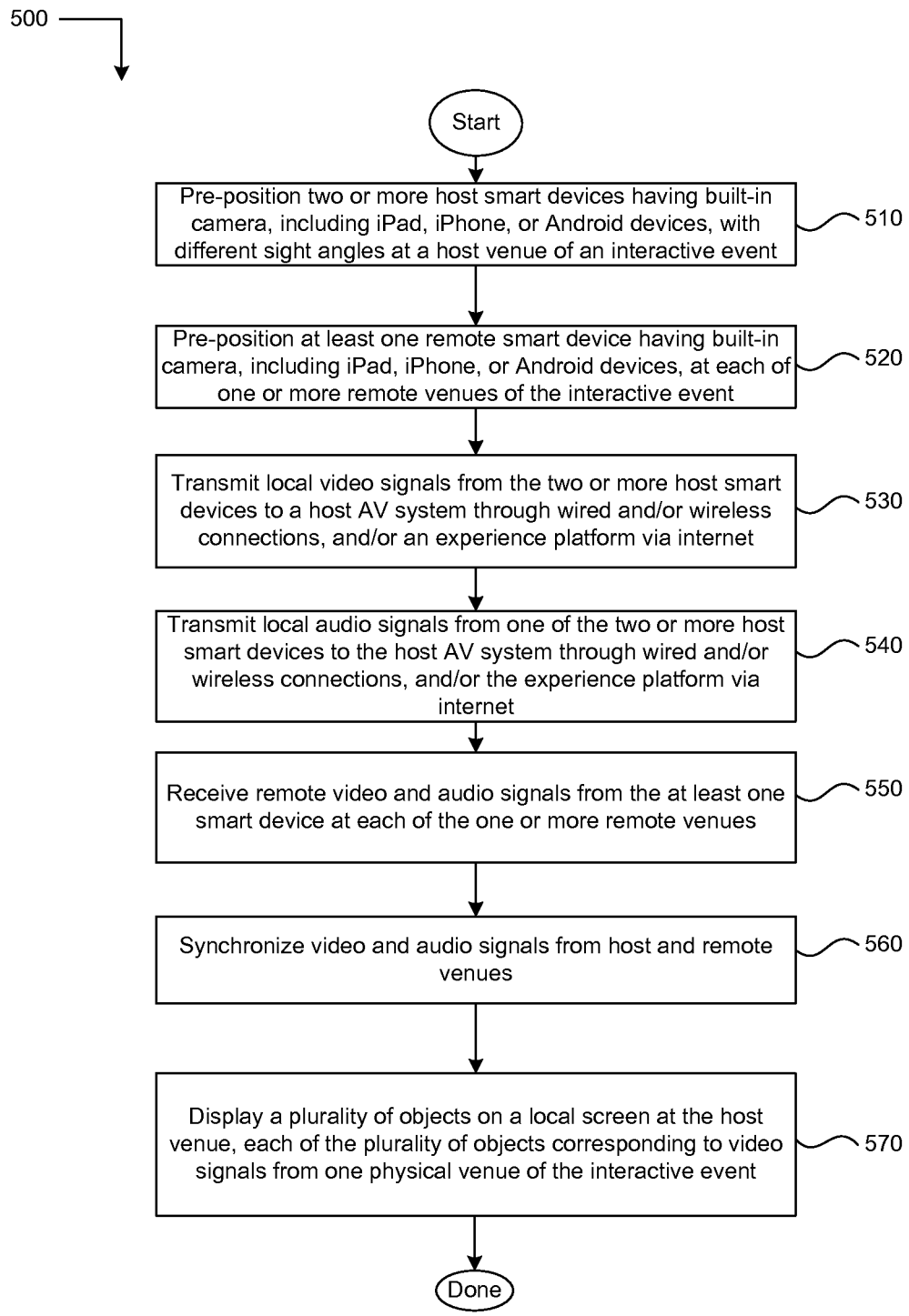
FIG. 5 illustrates a flow chart showing a set of operations 500 that may be used in accordance with yet another embodiment of the present disclosure.

FIG. 5 illustrates a flow chart showing a set of operations 500 that may be used in accordance with yet another embodiment of the present disclosure. At step 510, two or more smart devices may be pre-positioned with different sight angles at a host venue of an interactive event. Each of the smart devices has at least one built-in camera. In some embodiments, one of the smart devices may provide a wide master shot of the host venue to capture the overall live event at the host venue. One of the smart devices may provide a close-up image of the host participant. In some implementations, one of the smart devices may be configured to capture "audiences" at the host venue. At step 520, one or more smart device may be pre-positioned at each of one or more remote physical venues of the interactive event. One smart device may be configured to provide a wide master shot of the corresponding venue to capture all participants at the venue.

At step 530, local video signals from the two or more host smart devices may be transmitted to a host AV system through wired and/or wireless connections and/or may be transmitted to an experience platform via internet. In some implementations, video signals from multiple smart devices may be combined and transmitted to the host AV system. The combined video signals from the host venue may then be transmitted to the experience platform. At step 540, local audio signals may be transmitted from one of the two or more smart devices to the host AV system through wired and/or wireless connections. In some embodiments, audio signals from a microphone at the host venue may also be transmitted to the host AV system. The audio signals from the smart device and the microphone at the host venue may be combined and transmitted to the experience platform.

Remote video and audio signals from at least one smart device at each of the one or more remote venues may be transmitted to the experience platform, step 550. Video and audio signals from the host and remote physical venues may be combined and transmitted to display screens of each of the physical venues, step 560. At step 570, a plurality of objects may be displayed on a local screen at the host venue—each of the plurality of objects corresponding to video signals from one physical venue of the interactive event.

As will be appreciated, the method 500 of FIG. 5 can be extrapolated to a variety of different activities in a variety of different interactive events. For example, a host participant may be providing lectures to other participants across a plurality of physical venues. The host participant may engage in dialogue with local and remote participants while the interactive event experience may be synchronized among all participants. For another example, a host participant may host an auction event to potential buyers at a plurality of physical venues.

While the method 500 of FIG. 5 is described in the context of a single host participant, the present disclosure contemplates a variety of different contexts including multiple co-host participants acting in the interactive event. The co-host participants could be acting at a variety of locations.

Figure 6:
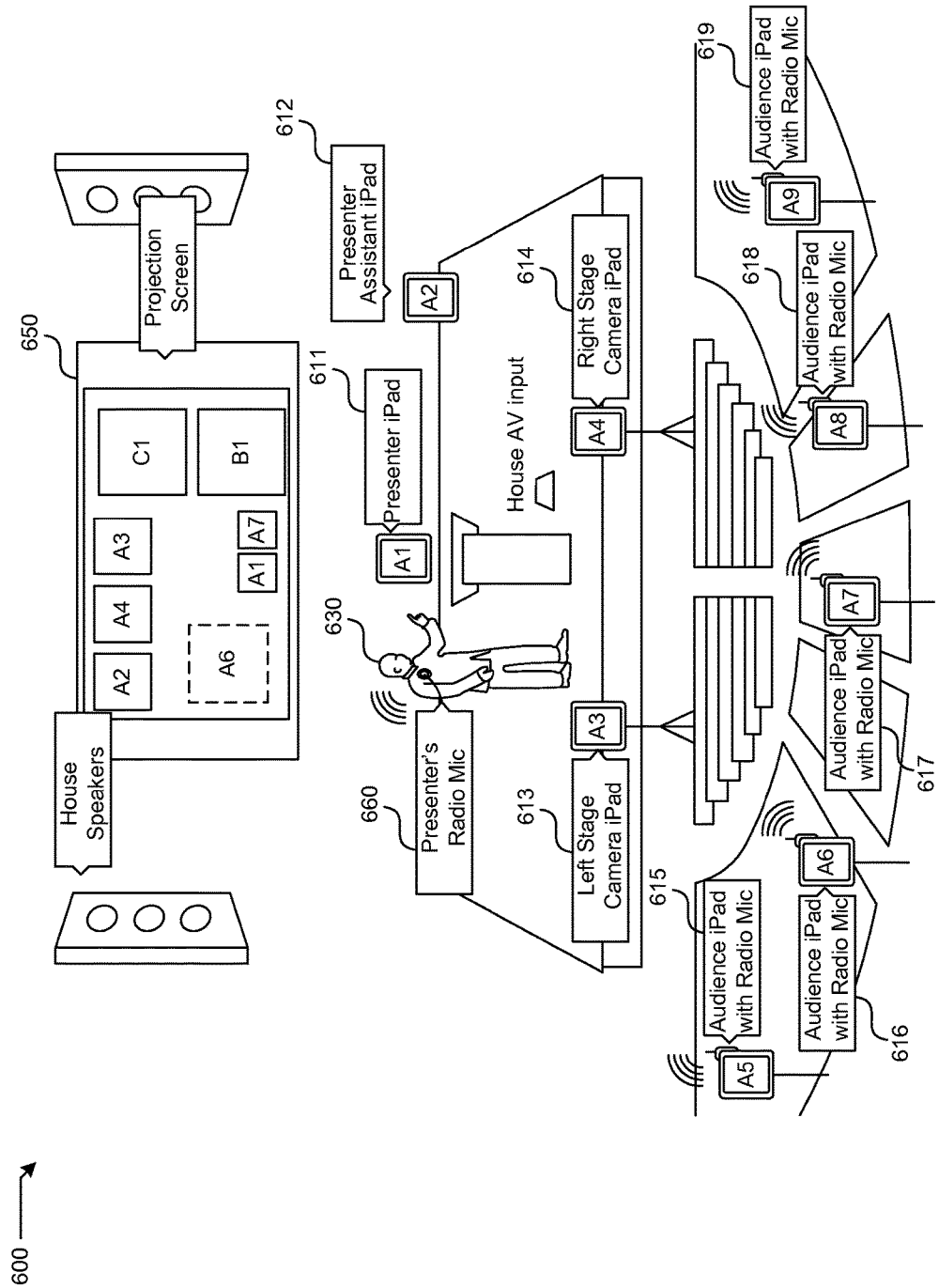
FIG. 6 illustrates architecture of a local host venue in accordance with yet another embodiment of the present disclosure.

FIG. 6 illustrates architecture of a local physical venue in accordance with yet another embodiment of the present disclosure. As illustrated in the architecture, a plurality of iPads 611-619 may be pre-positioned to capture a presenter 630 and audience at the local physical venue and stream captured video and audio signals to a local AV system and/or an experience platform. Presenter iPad 611 may be pre-positioned on the stage with the presenter. The presenter 630 can view and interact with remote participants through the device. In some implementations, audio signals from remote physical venues may be shared with the host venue through the iPad 611. A projection screen 650 may be provided at the host venue so that audience or participants at the host venue can view remote audience or participants.

In some implementations, a presenter assistant iPad 612 may be provided, which allows the assistant to add or remove digital assets from the content layer of the interactive event. The presenter assistant iPad 612 can be located anywhere at the host venue. In some implementations, the iPads at the host venue may be mounted on tablet holding devices, such as tripods, microphone stands, and/or iPad holders. In some implementations, stage camera iPads 613 and 614 may be pre-positioned on stationary table holding devices (e.g., tripods) to capture video of the presenter 630 from different angles and broadcast them to remote venues. In some implementations, audience iPads 615, 616, 617, 618 and 619 may be provided and fastened to moveable tablet holding devices (e.g., unipods) to capture video and audio of audience answering questions. The audience iPads 615-619 may be equipped with wireless radio microphones to capture audio from the audience. In some implementations, the audio from the wireless radio microphones may be captured by wireless receivers and sent directly to the host AV system.

Figure 7:
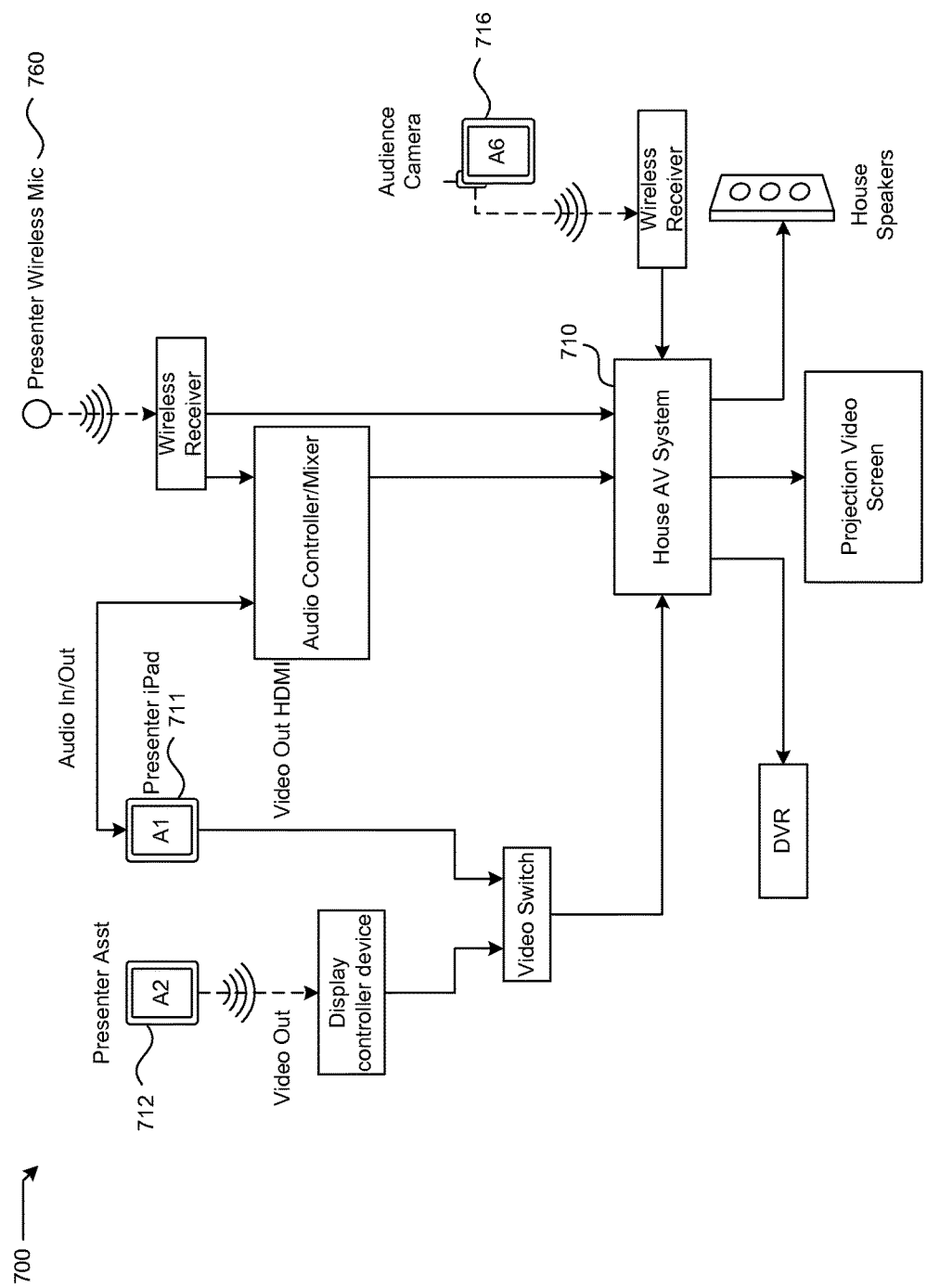
FIG. 7 illustrates architecture of video and audio system at a local host venue of an interactive event in accordance with yet another embodiment of the present disclosure.

FIG. 7 illustrates architecture of video and audio system at a local host venue 700 of a live event in accordance with yet another embodiment of the present disclosure. In some embodiments, video signals captured at the host venue 700 (e.g., video signals from presenter iPad 711, presenter assistant iPad 712 and audience camera/iPad 716) may be transmitted to a house AV system 710 through wired and/or wireless connections. Audio signals captured at the host venue 700 (e.g., audio signals from presenter iPad 711 and presenter wireless microphone 760) may also be transmitted to the host AV system 710 through wired or wireless connections and combined into one set of audio signals. The house AV system 710 can couple and synchronize received video and audio signals at the host venue 700. The house AV system 710 may transmit synchronized video and audio signals to an experience platform via internet, a projection video screen, and/or house speakers at the host venue 700. In some implementations, synchronized video signals may also be transmitted to a DVR for recording.

In some embodiments, video and audio signals captured at the host venue 700 can be directly transmitted to an experience platform 160 via internet. The experience platform 160 can couple and synchronize video and audio signals from a plurality of physical venues of the live event and then transmit synchronize video and audio signals to display devices at all physical venues.

Figure 8:
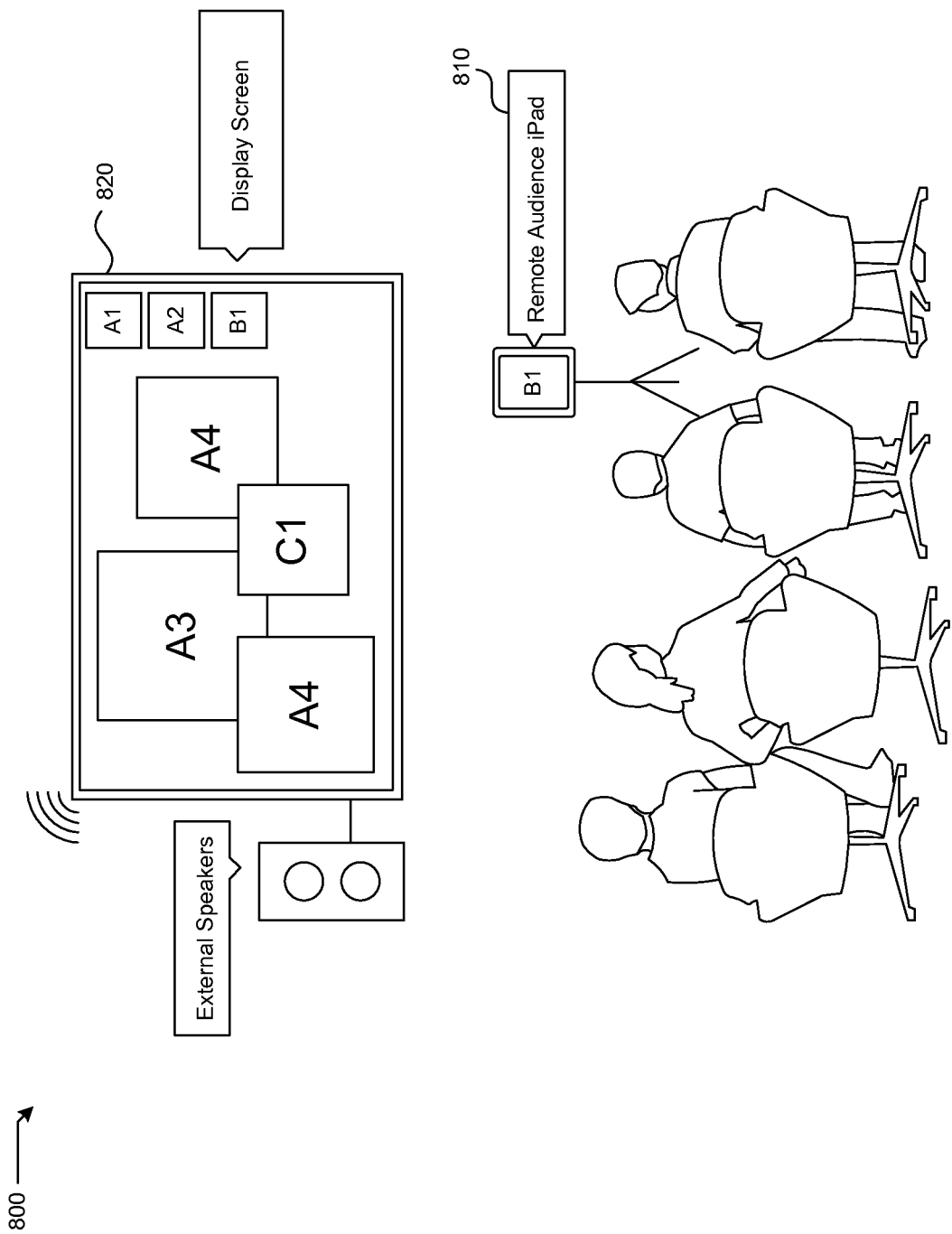
FIGS. 8-9 illustrate architecture of a remote physical venue in accordance with yet another embodiment of the present disclosure.

FIG. 8 illustrates architecture of a remote physical venue 800 of a live event in accordance with yet another embodiment of the present disclosure. In some embodiments, a remote audience iPad 810 may be provided to capture remote audience or participants of a specific remote physical venue 800 to share with other physical venues of the interactive event. The iPad 810 may be used to capture video of participants asking or answering questions and share the video with other physical venues, and broadcast audio and video signals from other physical venues of the interactive event onto a display screen of the specific remote venue 800. The display screen 820 may be any suitable display device, such as a digital TV, iPad, Apple TV, tablet, projection system etc.

In some implementations, a moderator or a specific participant can be in charge of managing the display of the video from the iPad 810 and capturing close-up video of participants who are asking or answering questions. In some implementations, the iPad 810 may be positioned on a stationary tablet holding device and may be used to capture video of overall participants at the specific remote venue 800.

Figure 9:
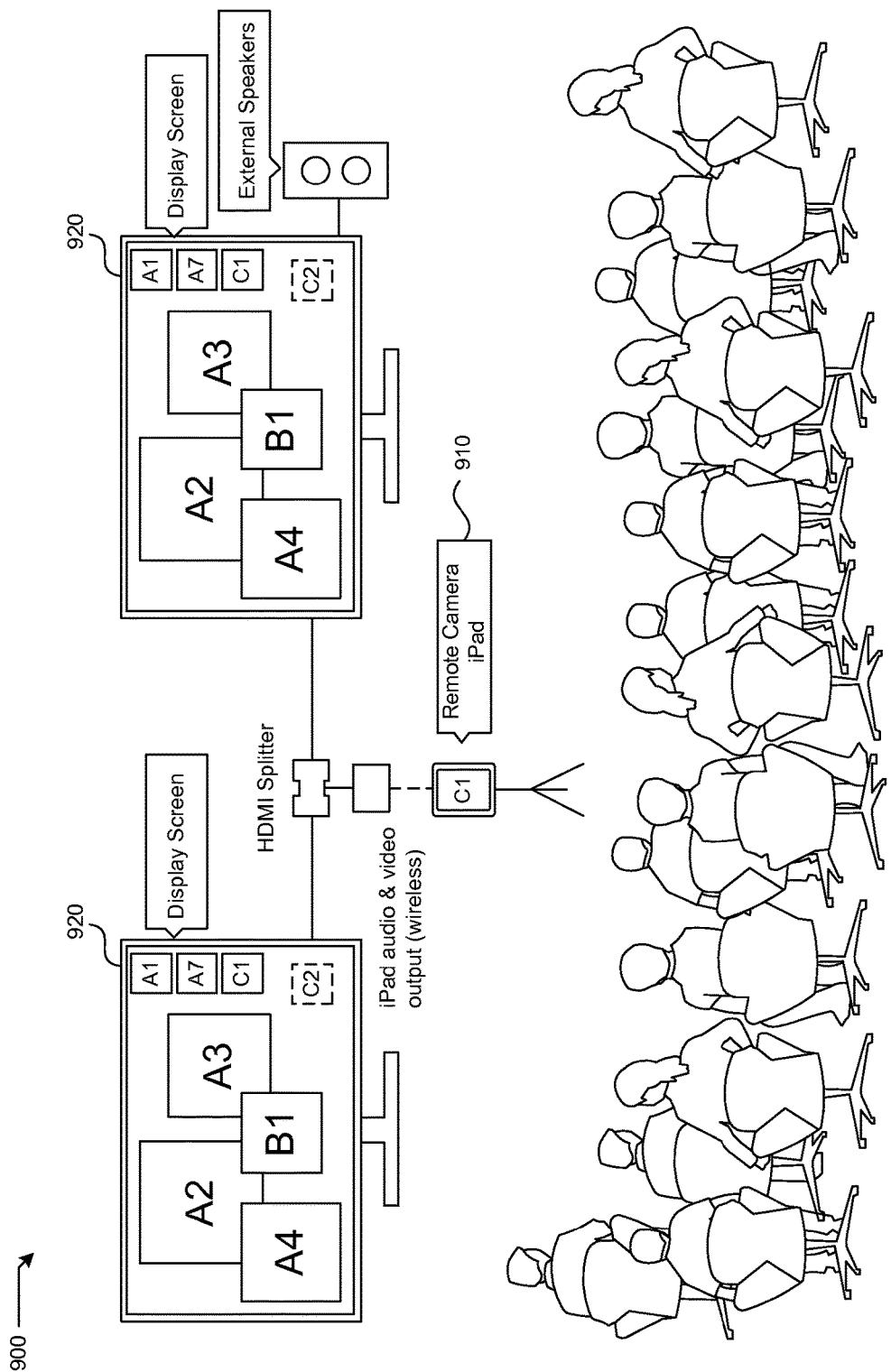

FIG. 9 illustrates architecture of a large remote physical venue in accordance with yet another embodiment of the present disclosure. In some implementations, a remote audience iPad 910 may be provided to capture participants at a large remote venue 900 and share the video and audio signals with other venues of the interactive event. In some implementations, the iPad 910 may be used to capture videos of participants at the large venue 900 asking or answering questions and share the video with other physical venues. In some implementations, the iPad 910 may broadcast audio and video signals from other physical venues of the interactive event onto a display screen 920 of the specific remote venue 900. In some implementations, two or more display screens may be provided at a specific remote venue.

Figure 10:
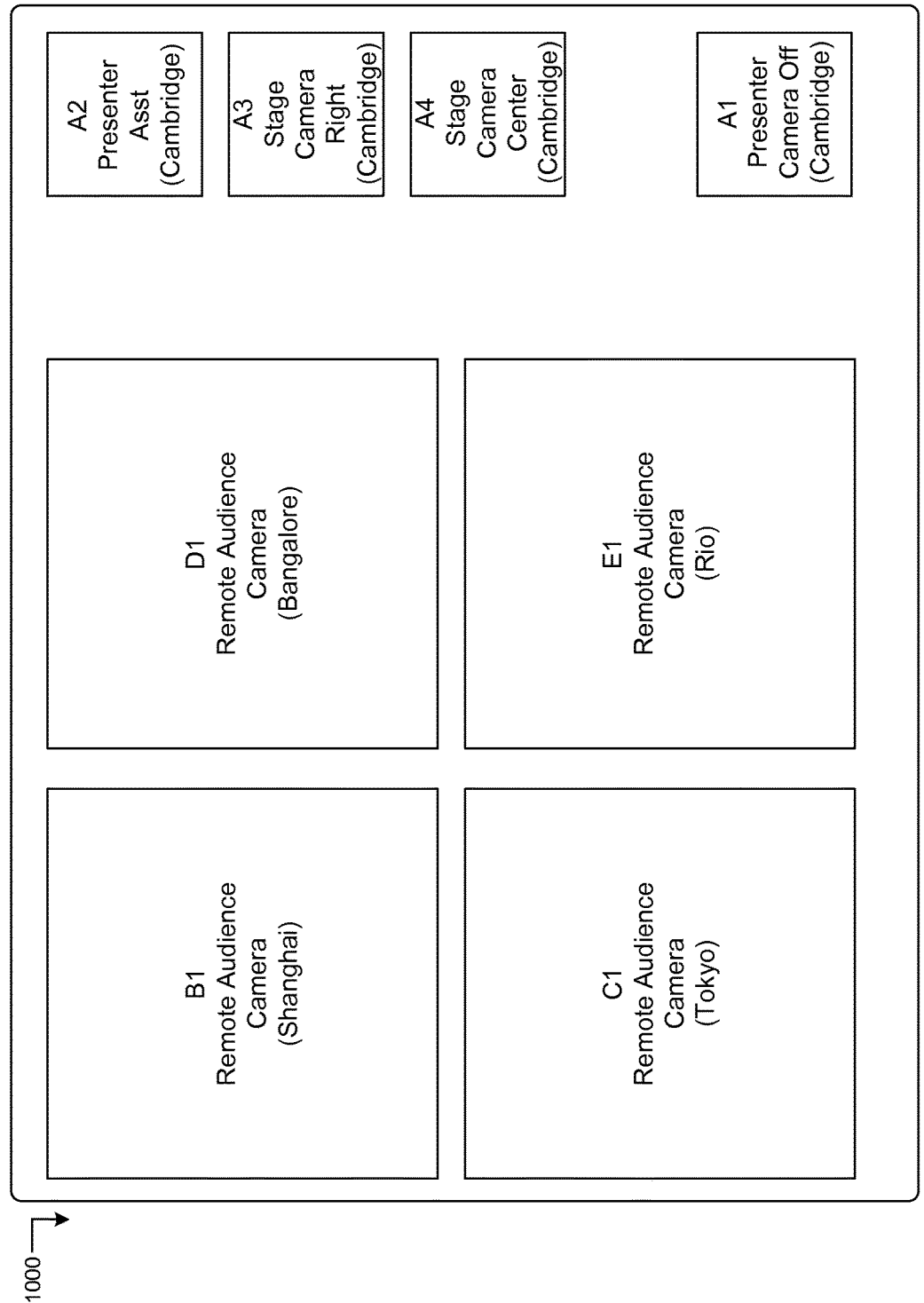
FIGS. 10-12 illustrate layouts of a display screen at a local host venue in accordance with yet another embodiment of the present disclosure.
Figure 11:
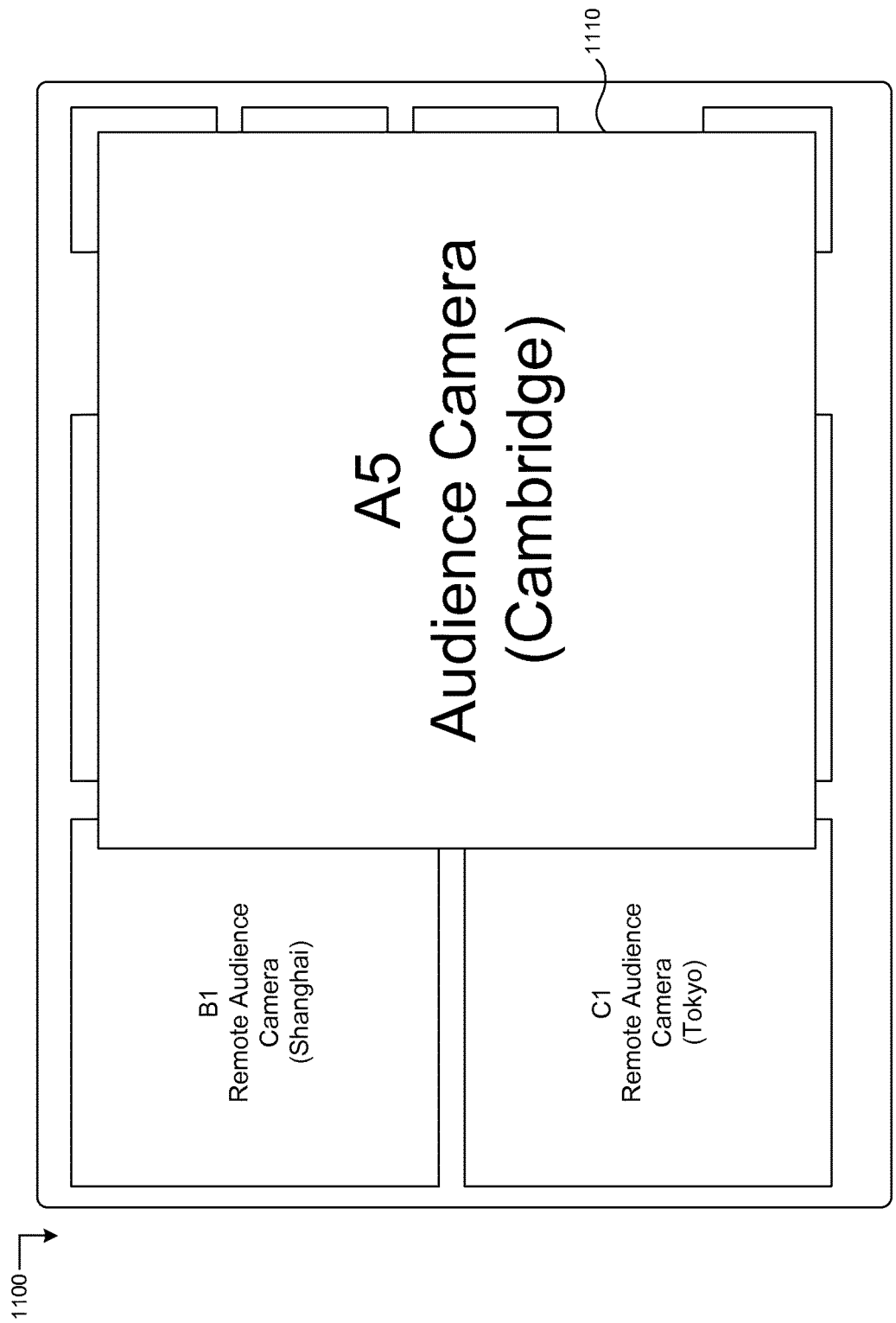
Figure 12:
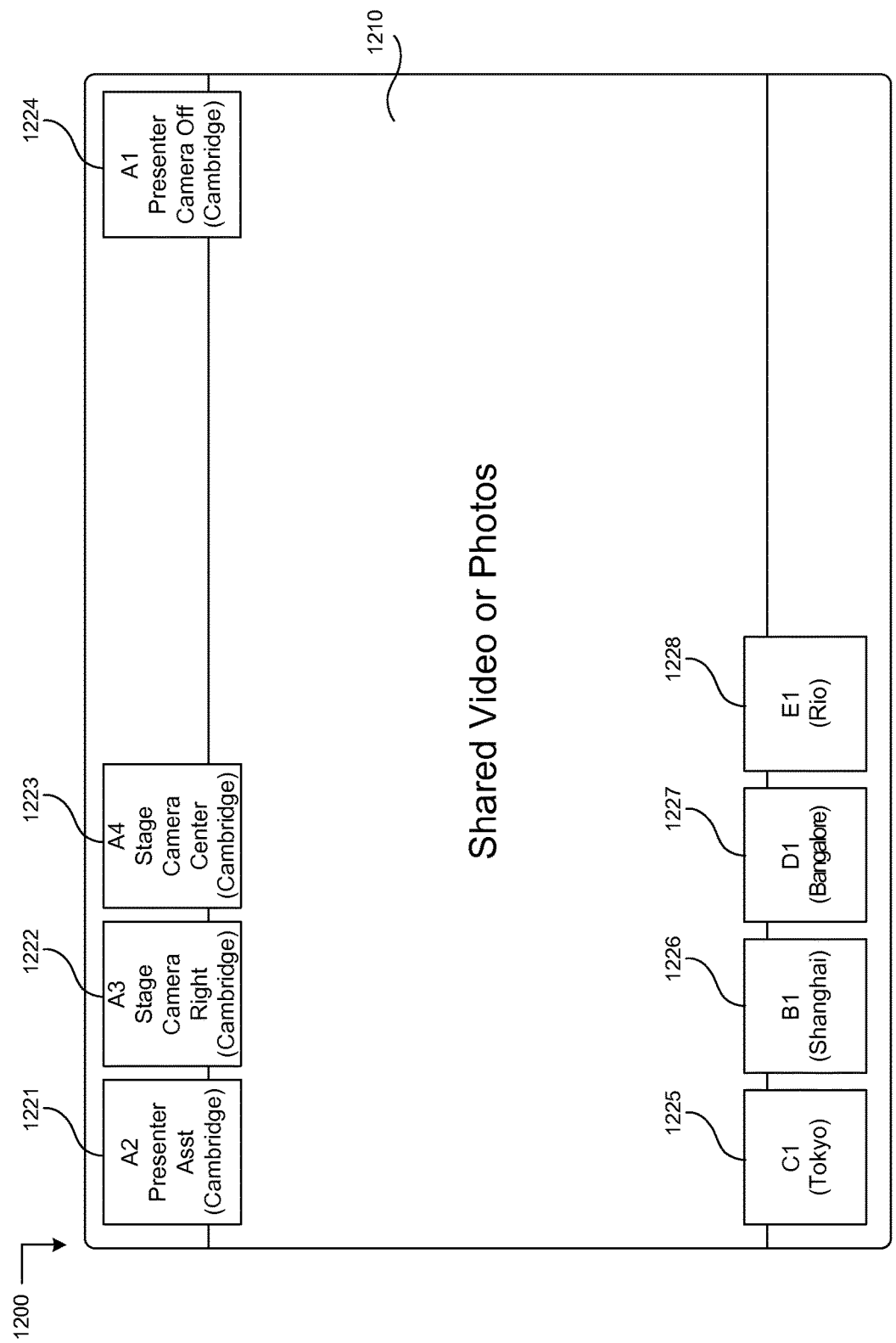

FIGS. 10-12 illustrate layouts of display screen at a local physical venue in accordance with yet another embodiment of the present disclosure. As illustrated in FIG. 6, the presenter iPad 611 may be used as a device for the presenter to view and interact with remote participants. The presenter 630 can control the position and size of video object on the display of the iPad 611.

FIG. 10 illustrates a default layout 1000 of the presenter iPad 611 while the presenter 630 is speaking. In some implementations, the size of objects corresponding to remote venues may be maximized so that the presenter 630 and local audience or participants can view audience or participants at remote physical venues. The presenter can call upon participants at remote physical venues or engage in dialogue with a specific remote participant.

FIG. 11 illustrates a default layout 1100 of the presenter iPad 611 while the presenter 630 is talking with a specific participant. In some implementations, the presenter 630 can choose to talk with a specific participant at the host venue or a remote venue. The specific participant may speak into one of the audience iPads or one remote audience iPad. In some embodiments, the video object corresponding to the specific participant may be a prominent object on the screen and may be enlarged to make it the most conspicuous object on the screen. In some implementations, the video object corresponding to the specific participant may be overlaid atop all the other video objects. For example, the video object 1110 corresponding to audience camera A5 may be enlarged and overlaid on top of other video objects.

FIG. 12 illustrates a default layout 1200 of the presenter iPad 611 when the presenter 630 is sharing a video with other participants of the interactive event. The presenter 630 can choose to play a video or add a photo 1210 on the content layer of the interactive event. In some implementations, while the video is being played or the photo is added, objects 1221-1228 corresponding to video streams from host and remote physical venues of the interactive event may be automatically or manually resized and/or repositioned. For example, the video objects 1221-1228 may be reduced in size or minimized and moved to the edge of the screen so that the visibility of the video or photo content 1210 may be maximized. When the video has been played or the photo 1210 has been removed from the content layer, these objects 1221-1228 may be automatically resized and repositioned to their default layouts or manually resized and repositioned.

Figure 13:
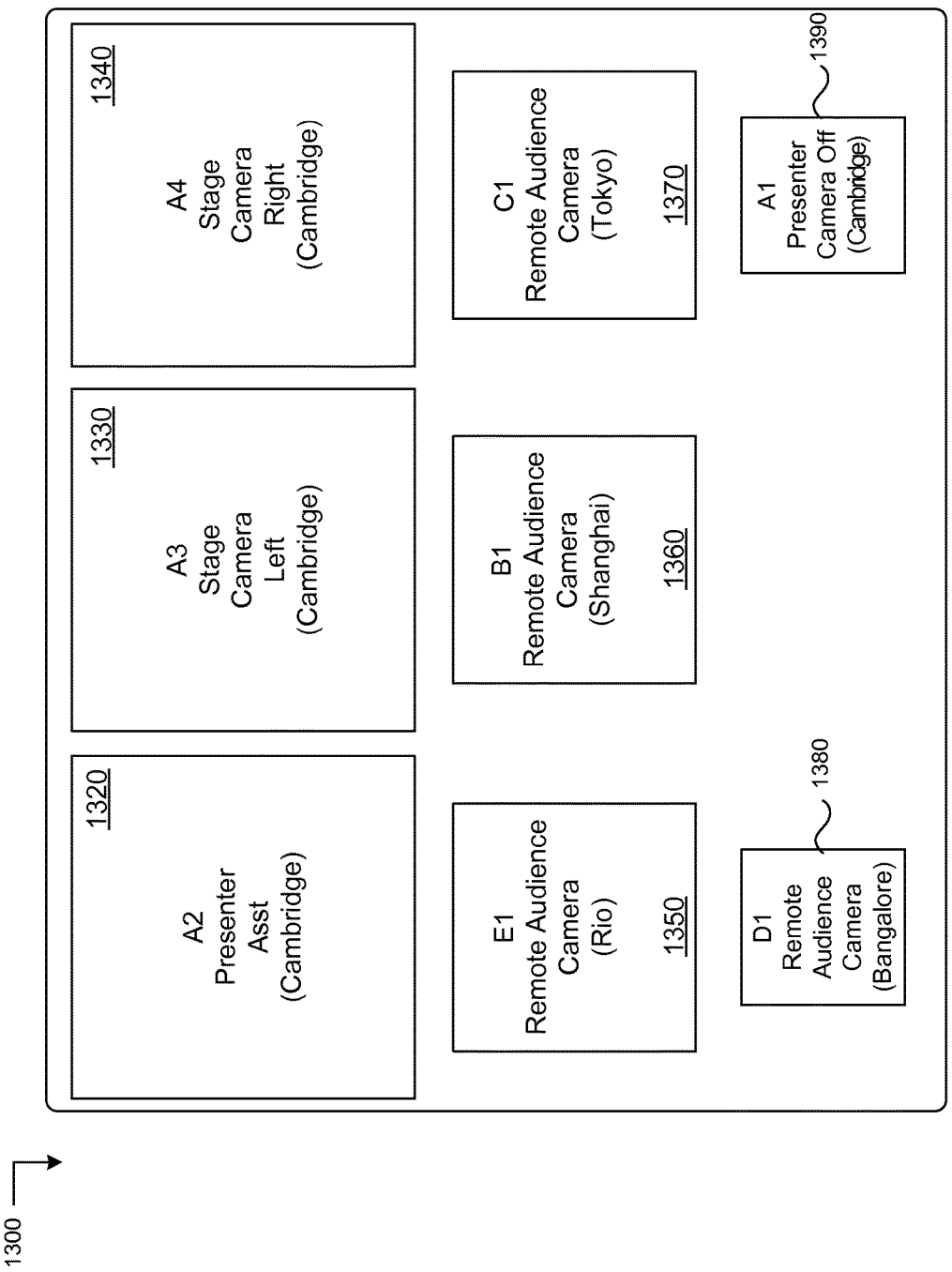
FIGS. 13-15 illustrate layouts of a display screen at a remote physical venue in accordance with yet another embodiment of the present disclosure.
Figure 14:
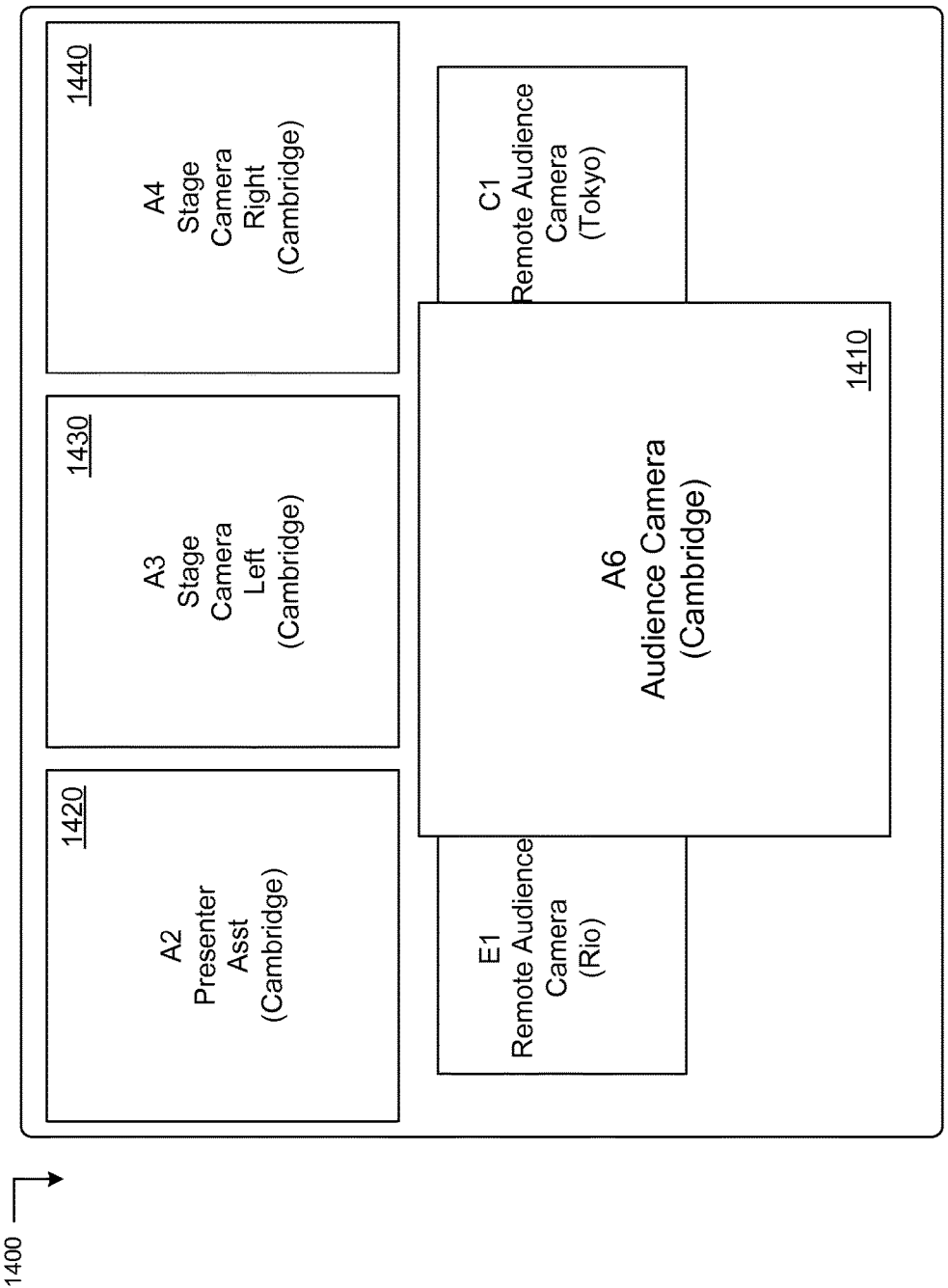
Figure 15:
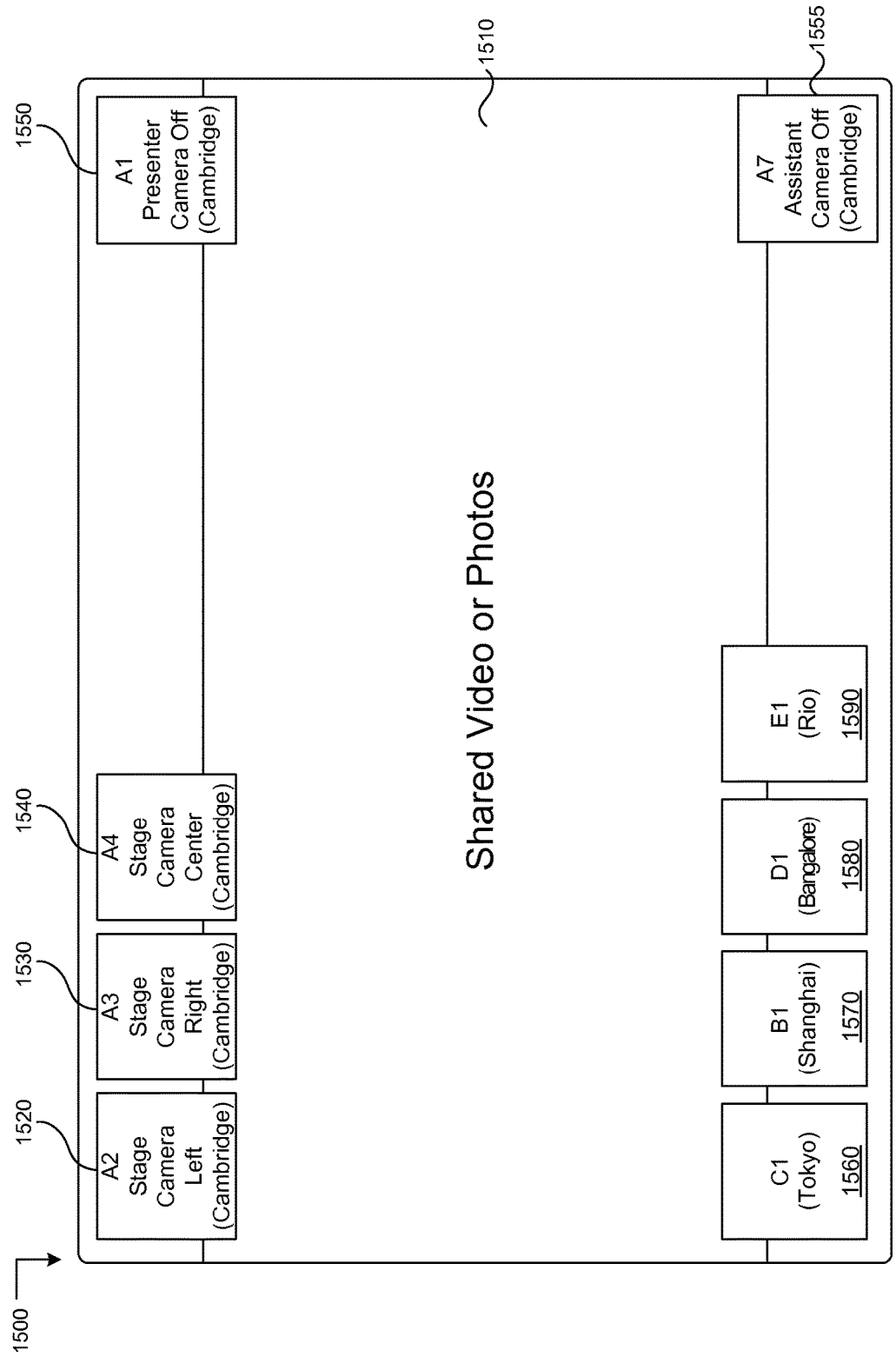

FIGS. 13-15 illustrate layouts of display screen at a specific remote physical venue in accordance with yet another embodiment of the present disclosure. As illustrated in FIG. 8, a moderator or a particular participant can be in charge of managing the display of the video from the iPad 810. FIG. 13 illustrates a default layout 1300 of display screen at the specific remote physical venue when the presenter 630 is speaking. In some implementations, the video objects corresponding to video signals from the presenter assistant iPad 1320, the stage left iPad 1330 and the stage right iPad 1340 may be given a large size on the screen. Video objects corresponding to other remote physical venues 1350-1370 may be given a medium size on the screen. Video objects 1380-1890 corresponding to the specific remote physical venue and the presenter iPad A1 may be given a small size on the screen.

FIG. 14 illustrates a layout 1400 of display screen at the specific remote physical venue when the presenter 630 is talking with a specific participant. In some implementations, the presenter 630 can choose to engage in dialogue with a specific participant at the host venue or a specific remote venue. When the presenter 630 is talking with a specific participant at the host venue, an appropriate audience iPad may be activated and the video object 1410 corresponding to the specific participant may appear in the content layer on display screen at the specific remote venue. In some implementations, the video object 1410 corresponding to the specific participant may be automatically enlarged or manually enlarged by the moderator or the particular participant. In some implementations, the video object 1410 corresponding to the specific participant or the specific remote venue may overlay other video objects on the screen. In some implementations, the presenter's video objects 1420-1440 and the video object 1410 corresponding to the specific participant or the specific remote venue may overlay other video objects when the presenter is talking with the specific participant.

FIG. 15 illustrates a layout 1500 of a display screen at the specific remote physical venue when the presenter 630 is sharing a video with other participants of the interactive event. The presenter 630 can choose to play a video or add a photo 1510 on the content layer of the interactive event. In some implementations, while the video is being played or the photo is added, objects 1520-1590 corresponding to video streams from host and remote physical venues of the interactive event may be automatically or manually resized and/or repositioned. For example, these video objects 1520-1590 may be reduced in size or minimized and moved to the edge of the screen so that the visibility of the video or photo content may be maximized. When the video has been played or the photo has been removed from the content layer, these objects 1520-1590 may be automatically resized and repositioned to their default layouts or manually resized and repositioned.

Figure 16:
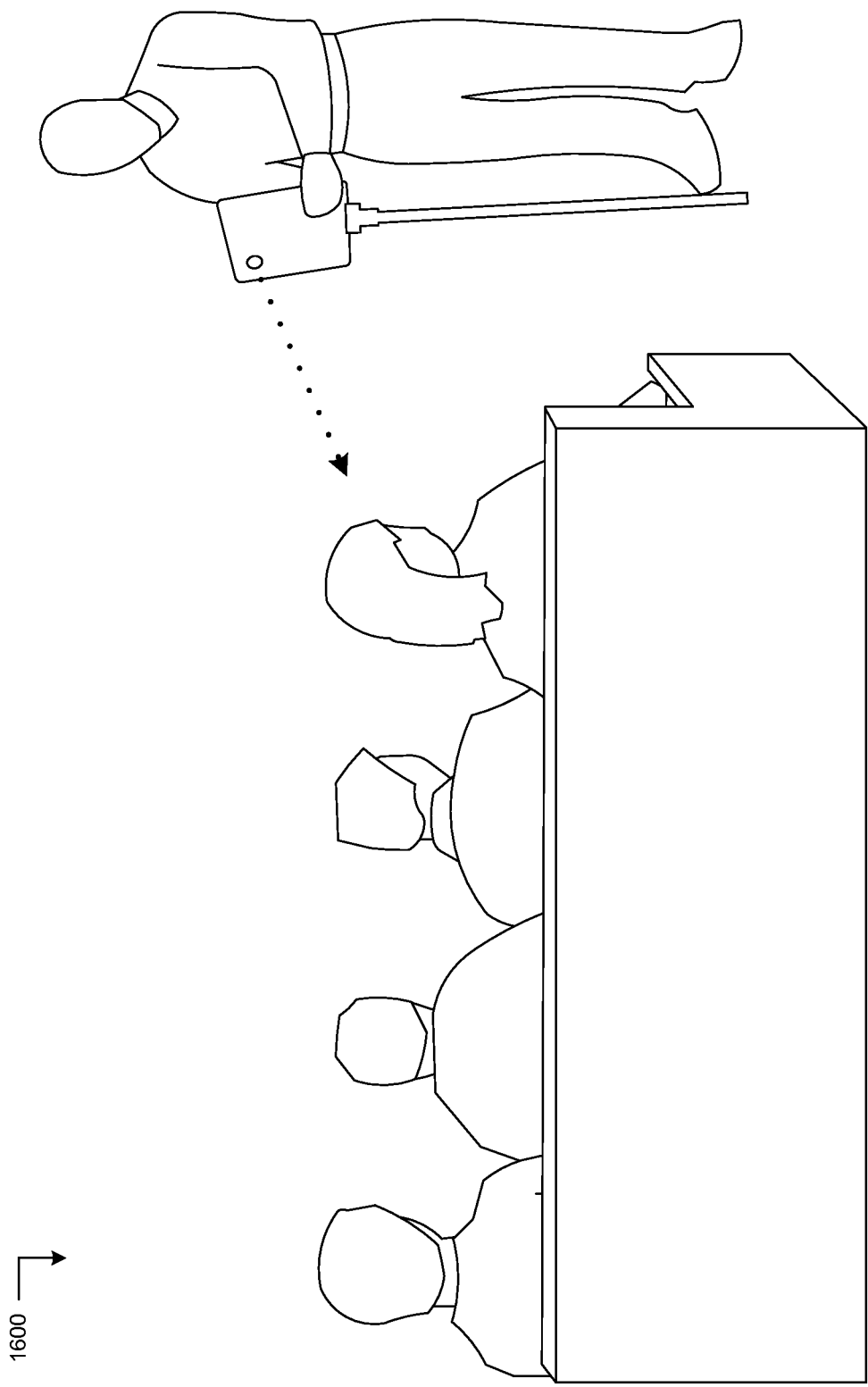
FIG. 16 illustrates an example of capturing responses from audiences or participants at a physical venue in accordance with yet another embodiment of the present disclosure.

FIG. 16 illustrates an example 1600 of capturing responses from audiences or participants at a physical venue in accordance with yet another embodiment of the present disclosure. In some implementations, an audience iPad may be manually positioned to capture responses from a specific participant when the specific participant is talking with the presenter.

Figure 17:
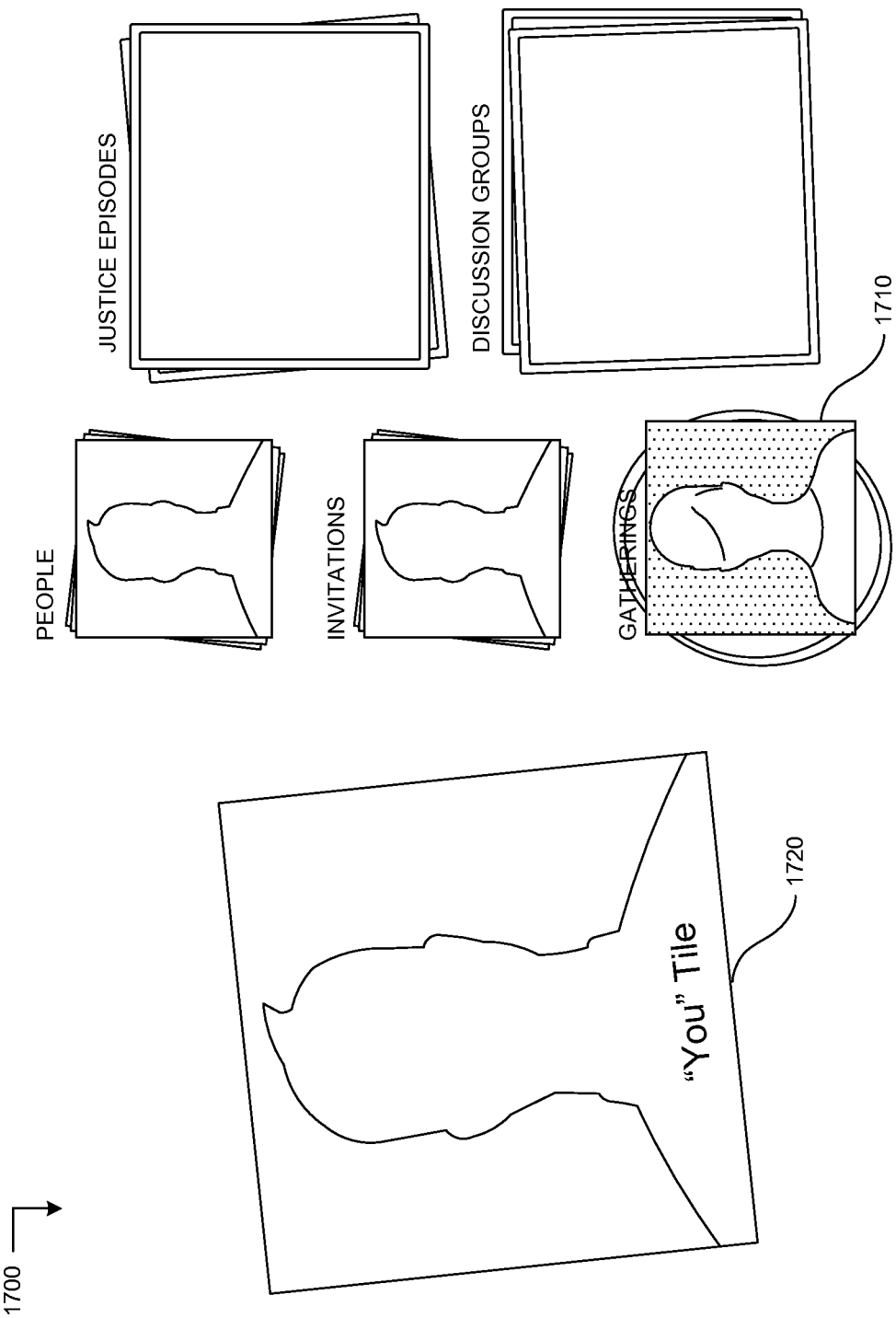
FIGS. 17-20 illustrate options to join an interactive event and exit the interactive event in accordance with yet another embodiment of the present disclosure.

FIGS. 17-20 illustrate examples of options to join an interactive event, manage a plurality of video objects on the display screen and exit the interactive event, in accordance with yet another embodiment of the present disclosure. In some embodiments, options may be provided for a specific participant to set up an account with the experience platform. When the account is established on the experience platform, the specific participant can join interactive events hosted by the experience platform. For example, as illustrated in FIG. 17, the specific particular can join an interactive event by locating the video object 1710 corresponding to the presenter and touching and dragging the presenter object 1710 on to an object 1720 corresponding to the specific participant.

Figure 18:
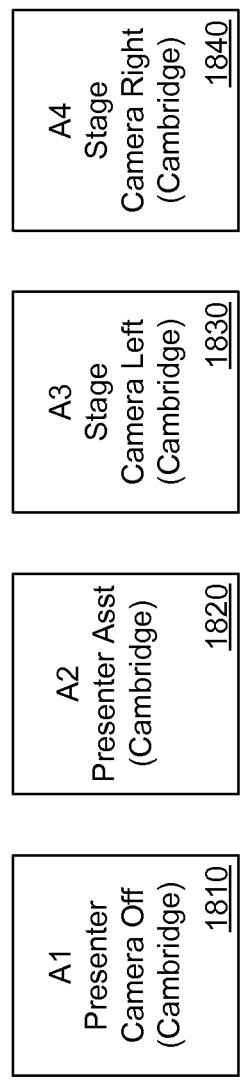
Figure 18:
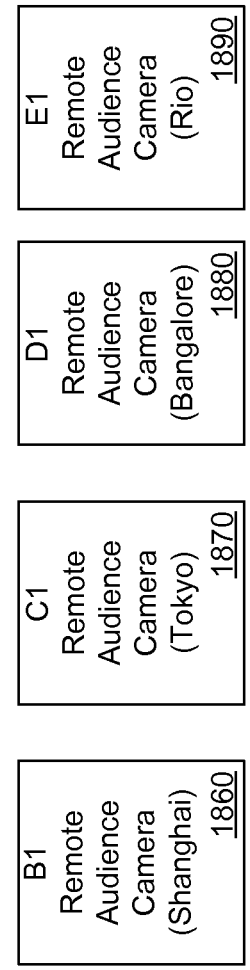
Figure 18:
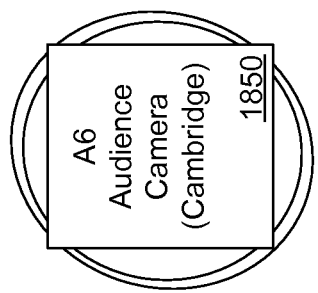
Figure 19:
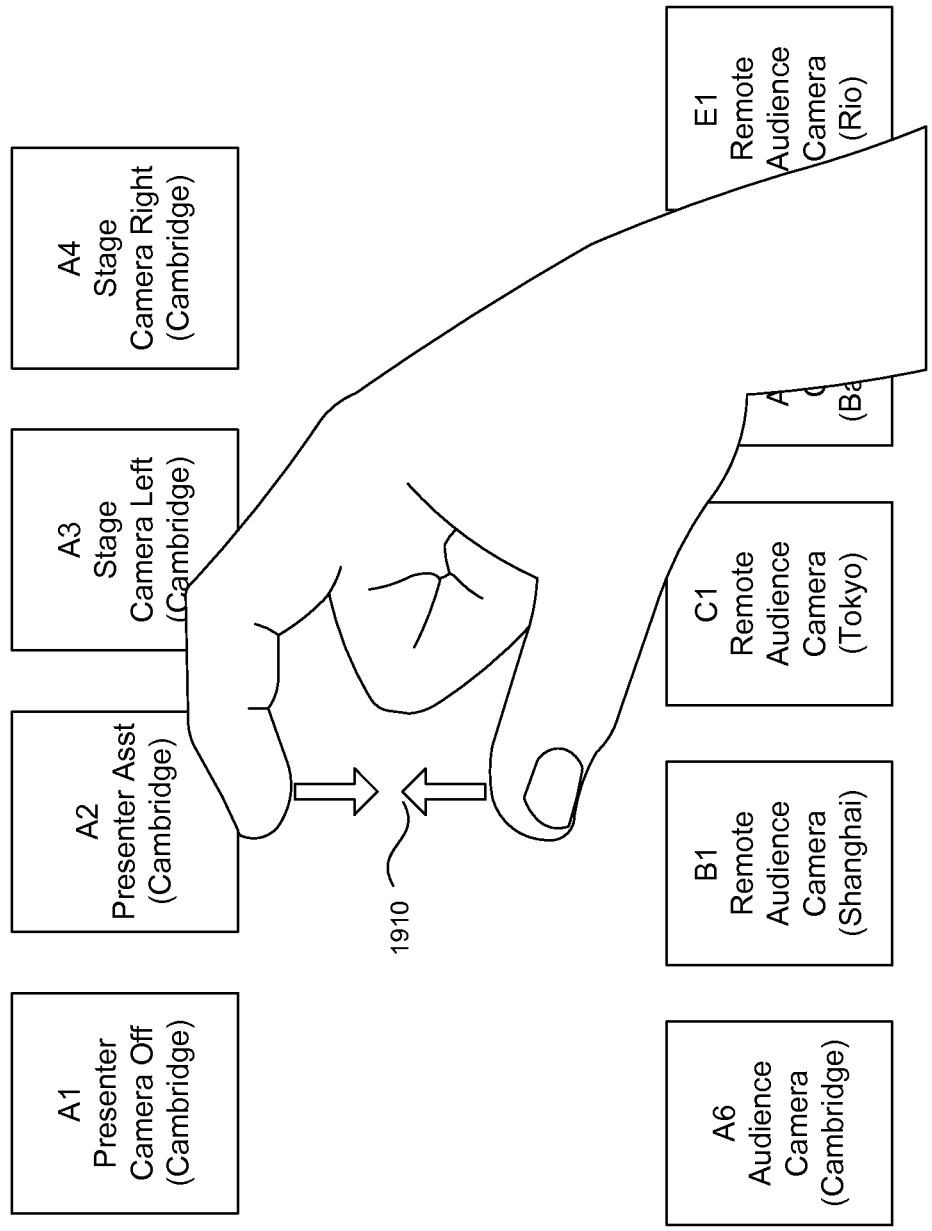
Figure 20:
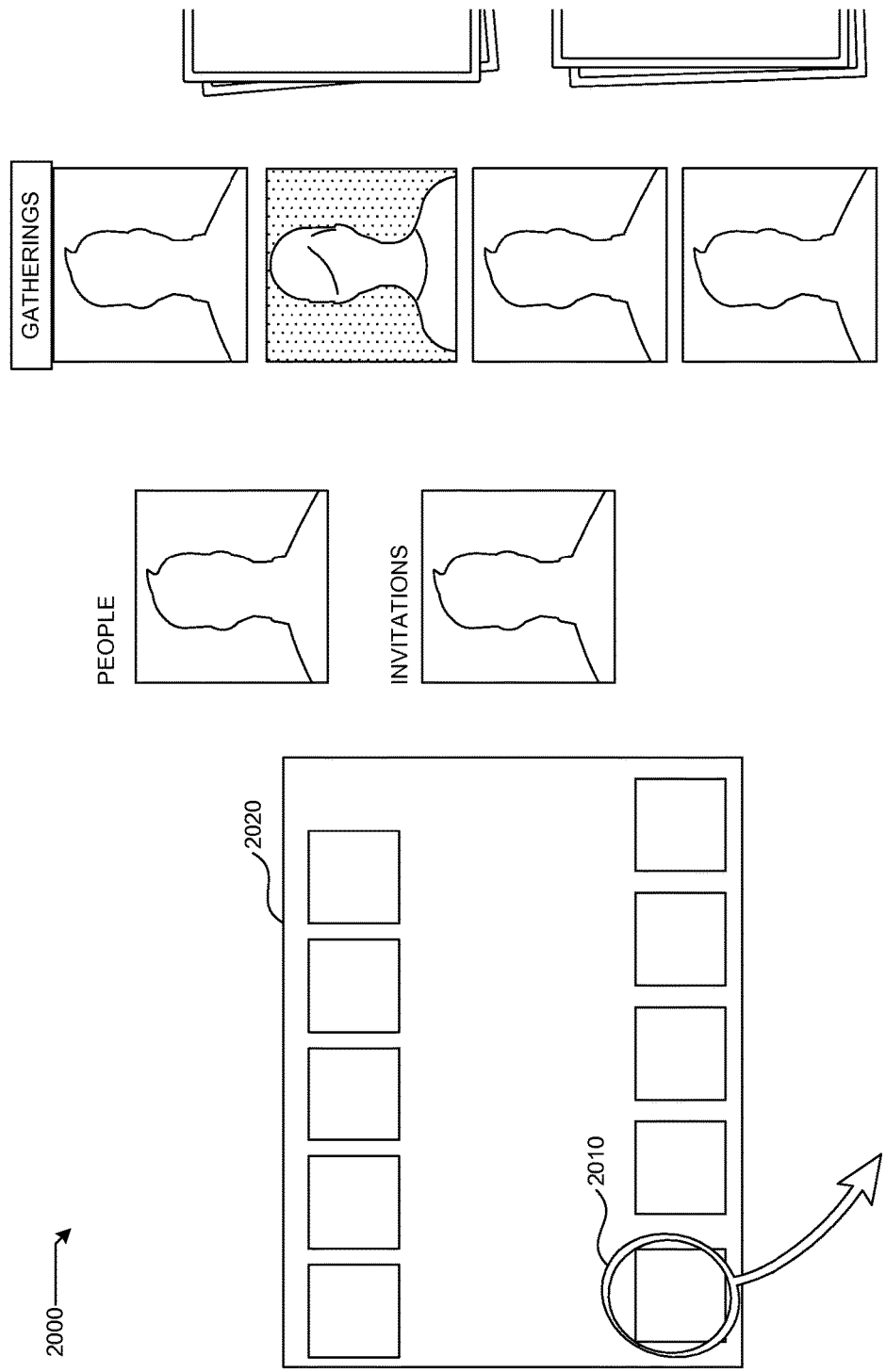

After entering the interactive event, as illustrated in FIG. 18, the specific participant can resize and reposition video objects 1810-1890 corresponding to video streams from the presenter and other remote physical venues. To exit the interactive event, as illustrated in FIGS. 19 and 20, the specific participant can choose to minimize the size of object 2010 corresponding to the interactive event and drag the object 2010 out of an object 2020 corresponding to the specific participant. In some implementations, the object of the interactive event may be minimized by a Pinch Close gesture 1910. When the object 2010 corresponding to the interactive event is minimized, the specific participant can exit the interactive event by holding and dragging the object 2010 out of the object 2020.

As will be appreciated by one of ordinary skill in the art, the operations or methods may be instantiated locally (i.e., on one local computer system) and may be distributed across remote computer systems. For example, it may be determined that the available computing power of the local computer system is insufficient or that additional computing power is needed, and may offload certain aspects of the operations to the cloud.

While the computer-readable medium is shown in an embodiment to be a single medium, the term "computer-readable medium" should be taken to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

Further examples of computer-readable medium, machine-readable storage medium, machine-readable medium or computer-readable (storage) medium include but are not limited to recordable type medium such as volatile and non-volatile memory devices, floppy and other removable disks, hard disk drives, optical disks, Digital Versatile Disks, among others and transmission type medium such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with computer code in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In general, the routines executed to implement the embodiments of the disclosure may be implemented as part of an operating system or a specific application, component, program, object, module or sequence of instructions referred to as "programs." The computer code typically comprises one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but is not limited to." As used herein, the terms "connected," "coupled," or any variant thereof, means any connection or coupling, either direct or indirect, between two or more elements; the coupling of connection between the elements can be physical, logical or a combination thereof. Additionally, the words "herein," "above," "below" and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word, any of the items in the list, all of the items in the list and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. Any patents and applications and other references noted above, including any that may be listed in accompanying filing papers, are incorporated herein by reference. Aspects of the disclosure can be modified if necessary to employ the systems, functions and concepts of the various references described above to provide yet further embodiments of the disclosure.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer code or equivalent electrical circuits, microcode or the like. Furthermore, it has also proven convenient at times to refer to these arrangements of operations as modules, without loss of generality. The described operations and their associated modules may be embodied in software, firmware, hardware or any combinations thereof.

Any of the steps, operations or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of medium suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

What is claimed is:

1. A method for providing an interactive event experience, the method comprising:
   receiving live stream signals, including audio signals, from each of a plurality of physical venues of an interactive event;
   synchronizing the live stream signals from the plurality of physical venues;
   presenting a plurality of objects on a content layer that is instantiated at each of a plurality of display devices of each of the plurality of physical venues, each of the plurality of objects corresponding to live stream signals from one of the plurality of physical venues; and
   managing presentation of each of the plurality of objects on a particular display device at a first physical venue of the plurality of physical venues;
   wherein managing the presentation includes providing options to manage the position of each of the plurality of objects relative to each other;
   wherein the volume of the audio signal associated with a second object of the plurality of objects is based on a distance between the second object and a first object corresponding to the first physical venue, the second object corresponding to a second physical venue of the plurality of physical venues.

2. The method as recited in claim 1, wherein the presentation of each of the plurality of objects on the particular display device is managed by an experience platform according to a predetermined mechanism.

3. The method as recited in claim 2, wherein the presentation of each of the plurality of objects on the particular display device includes appearance and volume of each of the plurality of objects and appearance of the plurality of objects on the particular device.

4. The method as recited in claim 3, wherein the presentation of each of the plurality of objects on the particular display device is at least partially managed by a specific participant at the first physical venue.

5. The method as recited in claim 1, wherein the live stream signals have computing element to enhance display appearance of the live stream signals on the display device.

6. The method as recited in claim 1, wherein the live stream signals include live video, pre-recorded video, graphic, texts, scripts, media files, software and documents.

7. The method as recited in claim 1, wherein the content layer includes the live stream signals of events, simultaneously happening at the plurality of physical venues, and content that a host participant shares with other participants of the interactive event.

8. The method as recited in claim 7, wherein the plurality of objects on the content layer are displayed with a specific pre-defined layout on the particular display device at the first physical venue.

9. The method as recited in claim 8, further comprising:
   when the host participant shares the content on the content layer or engages in a dialogue with a particular participant, automatically resizing and repositioning the plurality of objects on the particular display device at the first physical venue.

10. The method as recited in claim 1, wherein the live stream signals include video signals, captured by two or more smart devices at the first physical venue of the interactive event and
    wherein the audio signals include audio signals captured by one of the two or more smart devices and/or a microphone at the first physical venue, the two or more smart devices having a built-in camera.

11. The method as recited in claim 10, wherein at least one of the two or more smart devices is mounted on any of a tripod, microphone stand, or iPad holder.

12. The method as recited in claim 1, wherein the live stream signals include video and audio signals captured by at least one smart device at the second physical venue of the interactive event, the at least one smart device having a built-in camera.

13. The method as recited in claim 1, wherein the live stream signals from the plurality of physical venues are combined and synchronized by an AV system located at the first physical venue.

14. The method as recited in claim 1, further comprising:
    providing an attention option, via the particular display device at the first physical venue, to manage attention in the interactive event.

15. The method as recited in claim 14, wherein the attention option includes an option to draw or write in a plurality of colors on the content layer, each color representing a specific meaning.

16. An experience platform, the platform comprising:
a network interface; and
a memory coupled to the network interface, the memory including computer code stored thereon corresponding to operations for providing an interactive event experience, the operations comprising:
receiving, via the network interface, live stream signals, including audio signals, from each of a plurality of physical venues of an interactive event;
synchronizing the live stream signals from the plurality of physical venues;
presenting a plurality of objects on a content layer that is instantiated at each of a plurality of display devices of each of the plurality of physical venues, each of the plurality of objects corresponding to live stream signals from one of the plurality of physical venues; and
managing presentation of each of the plurality of objects on a particular display device at a first physical venue of the plurality of physical venues;
wherein managing the presentation includes providing options to manage the position of each of the plurality of objects relative to each other;
wherein the volume of the audio signal associated with a second object of the plurality of objects is based on a distance between the second object and a first object corresponding to the first physical venue, the second object corresponding to a second physical venue of the plurality of physical venues.

17. The experience platform as recited in claim 16, wherein the presentation of each of the plurality of objects on the particular display device is managed by the experience platform according to a predetermined mechanism.

18. The experience platform as recited in claim 17, wherein the presentation of each of the plurality of objects on the particular display device includes appearance and volume of each of the plurality of objects and appearance of the plurality of objects on the particular display device.

19. The experience platform as recited in claim 18, wherein the presentation of each of the plurality of objects on the particular display device is at least partially managed by a specific participant at the first physical venue.

20. The experience platform as recited in claim 16, wherein the live stream signals have computing element to enhance display appearance of the live stream signals on the display device.

21. The experience platform as recited in claim 16, wherein the live stream signals include live video, pre-recorded video, graphic, texts, scripts, media files, software and documents.

22. The experience platform as recited in claim 16, wherein the content layer includes the live stream signals of events, simultaneously happening at the plurality of physical venues, and content that a host participant shares with other participants of the interactive event.

23. The experience platform as recited in claim 22, wherein the plurality of objects on the content layer are displayed with a specific pre-defined layout on the particular display device at the first physical venue.

24. The experience platform as recited in claim 23, wherein the operations further comprises: when the host participant shares the content on the content layer or engages in a dialogue with a particular participant, automatically resizing and repositioning the plurality of objects on the particular display device at the first physical venue.

25. The experience platform as recited in claim 16, wherein the live stream signals include video signals, captured by two or more smart devices at the first physical venue of the interactive event; and
wherein the audio signals include audio signals captured by one of the two or more smart devices and a microphone at the first physical venue, the two or more smart devices having a built-in camera.

26. The experience platform as recited in claim 25, wherein at least one of the two or more smart devices is mounted on any of a tripod, microphone stand, or iPad holder.

27. The experience platform as recited in claim 16, wherein the live stream signals include video and audio signals captured by at least one smart device at the second physical venue of the interactive event, the at least one smart device having a built-in camera.

28. The experience platform as recited in claim 16, wherein the live stream signals from the plurality of physical venues are combined and synchronized by an AV system located at the first physical venue.

29. The experience platform as recited in claim 16, wherein the operations further comprises providing an attention option, via the particular display device, to manage attention in the interactive event.

30. The experience platform as recited in claim 29, wherein the attention option includes an option to draw or write in a plurality of colors on the content layer, each color representing a specific meaning.

31. A server computer operating as part of an experience platform for providing an interactive event experience, the server computer comprising:
means for receiving live stream signals, including audio signals, from each of a plurality of physical venues of an interactive event;
means for synchronizing the live stream signals from the plurality of physical venues;
means for presenting a plurality of objects on a content layer that is instantiated at each of a plurality of display devices of each of the plurality of physical venues, each of the plurality of objects corresponding to live stream signals from one of the plurality of physical venues; and
means for managing presentation of each of the plurality of objects on a particular display device at a-first physical venue of the plurality of physical venues;
wherein managing the presentation includes providing options to manage the position of each of the plurality of objects relative to each other;
wherein the volume of the audio signal associated with a second object of the plurality of objects is based on a distance between the second object and a first object corresponding to the first physical venue, the second object corresponding to a second physical venue of the plurality of physical venues.

32. A method for providing an interactive event experience, the method comprising:
receiving video signals from two or more host smart devices at a host venue of an interactive event, each of the two or more host smart devices having a built-in camera, wherein the two or more host smart devices are pre-positioned with different sight angles at the host venue;
receiving video signals from one or more remote smart devices at each of remote physical venues of the interactive event, wherein the one or more remote smart devices is pre-positioned to capture participants at the corresponding physical venue;

receiving one set of audio signals from each of the host and remote physical venues of the interactive event, wherein the one set of audio signals are audio signals from a microphone, audio signal from a specific smart device, or combined audio signals from the microphone and the specific smart device at the corresponding physical venue;

synchronizing video and audio signals from the host and remote physical venues of the interactive event;

presenting a plurality of objects on a content layer instantiated at each of a plurality of display devices at each of the host and remote physical venues, each of the plurality of objects corresponding to video signals from one of the host or remote physical venues of the interactive event; and managing presentation of each of the plurality of objects on a particular display device at the host physical venue;

wherein managing the presentation includes providing options to manage the position of each of the plurality of objects relative to each other;

wherein the volume of the set of audio signals associated with a first object of the plurality of objects is based on a distance between the first object and a second object corresponding to the host physical venue, the first object corresponding to one of the remote physical venues.

33. A method for providing an interactive event experience, wherein two or more smart devices are pre-positioned with different sight angles at a host venue of an interactive event, wherein at least one smart device is pre-positioned at each of one or more remote venues of the interactive event, each of the smart devices having one or more built-in camera, the method comprising:

transmitting local video signals from the two or more host smart devices to a host AV system through wired or wireless connections;

transmitting local audio signals from one of the two or more host smart devices to the host AV system through wired or wireless connections;

receiving remote video and audio signals from the at least one smart device at each of the one or more remote venues;

synchronizing the local video and audio signals with the remote video and audio signals;

displaying a plurality of objects on a local screen at the host venue, each of the plurality of objects corresponding to video signals from one of either the host venue or one of the remote venues of the interactive event;

playing synchronized local and remote audio signals on a local speaker at the host venue; and providing options, via a producer smart device at the host venue, to manage the position of each of the plurality of objects relative to each other, as displayed on the local screen;

wherein the volume of the audio associated with a first object of the plurality of objects is based on a distance between the first object and a second object corresponding to the host venue, the first object corresponding to one of the remote venues.

34. A non-transitory computer readable medium containing instructions which when executed by a computer system, cause the computer system to:

receive live stream signals, including audio signals, from each of a plurality of physical venues of an interactive event;

synchronize the live stream signals from the plurality of physical venues;

present a plurality of objects on a content layer that is instantiated at each of a plurality of display devices of each of the plurality of physical venues, each of the plurality of objects corresponding to live stream signals from one of the plurality of physical venues; and manage presentation of each of the plurality of objects on a particular display device at a first physical venue of the plurality of physical venues;

wherein managing the presentation includes providing options to manage the position of each of the plurality of objects relative to each other;

wherein the volume of the audio signal associated with a second object of the plurality of objects is based on a distance between the second object and a first object corresponding to the first physical venue, the second object corresponding to a second physical venue of the plurality of physical venues.

* * * * *